US012658982B2

(12) United States Patent
Baligh et al.

(10) Patent No.: US 12,658,982 B2
(45) Date of Patent: Jun. 16, 2026

(54) SYSTEMS AND METHODS FOR MIMO COMMUNICATION WITH CONTROLLABLE ENVIRONMENTS

(71) Applicant: HUAWEI TECHNOLOGIES CO., LTD., Shenzhen (CN)

(72) Inventors: Mohammadhadi Baligh, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 424 days.

(21) Appl. No.: 18/324,215

(22) Filed: May 26, 2023

(65) Prior Publication Data

US 2023/0308139 A1 Sep. 28, 2023

Related U.S. Application Data

(63) Continuation of application No. PCT/CN2020/139158, filed on Dec. 24, 2020.

(51) Int. Cl.
*H04B 7/04* (2017.01)
*H04B 7/06* (2006.01)
*H04W 72/23* (2023.01)

(52) U.S. Cl.
CPC ....... *H04B 7/04013* (2023.05); *H04B 7/0617* (2013.01); *H04B 7/0626* (2013.01); *H04W 72/23* (2023.01)

(58) Field of Classification Search
CPC .......................... H04B 7/04013; H04B 7/0617; H04B 7/0626; H04W 72/23
See application file for complete search history.

(56) References Cited

U.S. PATENT DOCUMENTS

| | | | |
|---|---|---|---|
| 2016/0099504 A1 | 4/2016 | Nadarassin et al. | |
| 2022/0077919 A1* | 3/2022 | Li | H04B 7/04013 |
| 2023/0176174 A1* | 6/2023 | Penna | H01Q 3/46 |
| | | | 342/451 |
| 2023/0246674 A1* | 8/2023 | Åström | H04B 7/04013 |
| | | | 375/262 |

FOREIGN PATENT DOCUMENTS

| | | |
|---|---|---|
| CN | 111246496 A | 6/2020 |
| CN | 111416646 A | 7/2020 |
| CN | 111866726 A | 10/2020 |
| CN | 112039567 A | 12/2020 |

OTHER PUBLICATIONS

Chen, Zhi et al., "Intelligent Reflecting Surface Aided Terahertz Communication System Design," Journal of Microwaves; vol. 36; Aug. 1, 2020; 4 pages.

* cited by examiner

*Primary Examiner* — Kiet Tang

(74) *Attorney, Agent, or Firm* — Slater Matsil, LLP

(57) ABSTRACT

Aspects of the present disclosure provide methods of utilizing controllable metasurface devices capable of redirecting a wavefront transmitted by a transmitter to a receiver in the wireless network to take advantage of the controllable metasurface device capabilities, intelligence, coordination and reconfiguration speed, and thereby enable solutions having different signaling details and capability requirements. Methods described herein provide mechanisms for identification of a RIS deployed in a communication network, identification of possible RIS to UE links, setup of base station (BS) to RIS links and RIS to UE links, activation of the RIS, and configuration of UEs to receive data from the BS via redirection by the RIS.

20 Claims, 22 Drawing Sheets

182

450

470

464

475

460

466

480

600

620

640

720

760

770

| BS sends list of possible UEs | BS configures UE for RIS discovery | UE sends the RS |
| 772 | 774 | 776 |

| BS initiates measurement for link setup 782 | RIS informs BS of detected UE and feeds back the measurement 780 | RIS measures the RS 778 |

760

| BS configures BS and UEs for sensing 792 | UE senses the RIS 794 |

| BS initiates measurement for link setup 798 | UE informs BS of RIS discovery 796 |

740

800

| Network identifies potential links 802 | → | Network configures RIS with measurement patterns 804 | → | Network configures UE or UEs 806 |
| --- | --- | --- | --- | --- |

| Network shares raw or processed CSI to RIS 812 | ← | Network collects CSI 810 | ← | BS transmits RS to be used for measurement 808 |
| --- | --- | --- | --- | --- |

820

| Network configures RIS for measurement patterns 822 | → | Network configures UEs for connection 824 | → | UE and RIS maintain and measure link 826 |
| --- | --- | --- | --- | --- |

830

900

| Establish RIS-UE links 902 | → | Activate a subset of RIS-UE link 904 | → | UE performs RIS-UE link CSI-RS measurement 906 |

910

| RIS-UE link setup 912 | → | BS activates one UE-RIS link group for RIS 914 |
| Communication over active link 918 | ← | CSI measurement procedure for the link is activated 916 |

920

SYSTEMS AND METHODS FOR MIMO COMMUNICATION WITH CONTROLLABLE ENVIRONMENTS

CROSS REFERENCE

This application is a continuation of International Application No. PCT/CN2020/139158, filed on Dec. 24, 2020, the disclosure of which is hereby incorporated by reference in its entirety.

TECHNICAL FIELD

The present disclosure relates generally to wireless communications, and in particular embodiments, communication systems having controllable elements therein.

BACKGROUND

In some wireless communication systems, user equipments (UEs) wirelessly communicate with a base station (for example, NodeB, evolved NodeB or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

Metasurfaces have been investigated in optical systems for some time and recently have attracted interest in wireless communication systems. These metasurfaces are capable of affecting a wavefront that impinges upon them. Some types of these metasurfaces are controllable, meaning through changing the electromagnetic properties of the surface, the properties of the surface can be changed. For example, manipulation of the amplitude and/or phase can be achieved by changing an impedance or relative permittivity (and/or permeability) of the metamaterial.

As a result, a controllable metasurface can affect the environment and effective channel coefficients of a channel of which the metasurface is a part thereof. This results in the channel being represented as the combination of an incoming wireless channel and an outgoing wireless channel and the phase/amplitude response of the configurable metasurface.

Using these metasurfaces in wireless communication systems will necessitate methods for using them in the wireless network from deploying the metasurfaces to enabling them to work with other devices in the network.

SUMMARY

According to an aspect of the present disclosure, there is provided methods of utilizing controllable metasurface devices capable of redirecting a wavefront transmitted by a transmitter to a receiver in the wireless network to take advantage of the controllable metasurface device capabilities, intelligence, coordination and reconfiguration speed, and thereby enable solutions having different signaling details and capability requirements. Methods described herein provide mechanisms for identification of a RIS deployed in a communication network, identification of possible RIS to UE links, setup of base station (BS) to RIS links and RIS to UE links, activation of the RIS, and configuration of UEs to receive or transmit data from/to the BS via redirection by the RIS.

In some aspects of the disclosure there is provided a method involving a reflective intelligent surface (RIS) redirecting an identification of any RISs that are in proximity to a user equipment (UE), the identification sent from a base station (BS); the RIS receiving first configuration information to facilitate beam steering; and the RIS steering the beam between the BS and UE.

In some embodiments, the RIS receiving the first configuration information to facilitate the beam steering involves the RIS receiving configuration information that is used for configuring a first RIS pattern to redirect a waveform from the BS to the UE to enable the RIS to redirect the identification of any RISs that are in proximity to the UE.

In some embodiments, the RIS receiving configuration information to facilitate the beam steering includes receiving configuration information that is used for configuring a second RIS pattern for channel measurement to redirect a waveform from the BS to the UE.

In some embodiments, the method further involves: the RIS redirecting second configuration information to the UE to enable the UE to set up channel measurement; and the RIS redirecting a reference signal from the BS to the UE to allow channel estimation of the channel between the BS and the UE via the RIS.

In some embodiments, the method further involves: the RIS redirecting a channel measurement report from the UE to the BS based on the reference signal received by the UE that is redirected by the RIS; and the RIS receiving a channel measurement report from the UE based on the reference signal received by the UE.

In some embodiments, the method further involves, when the RIS receives the channel measurement report from the UE based on the reference signal received by the UE, using the channel measurement report to enable the RIS to generate a third RIS pattern to redirect the waveform when a BS to UE link is activating using the RIS to redirect the waveform.

In some embodiments, the RIS redirecting the second configuration information to the UE to enable the UE to set up channel measurement includes the BS redirecting physical layer control signaling to the UE.

In some embodiments, the RIS receiving the first configuration information to facilitate the beam steering involves the RIS receiving configuration information to activate the link with the UE, the configuration information including at least one of: information that is used for configuring a third RIS pattern to redirect a waveform from the BS to the UE; and a short term activation of the RIS for communication with the UE.

In some embodiments, the information that is used for configuring the third RIS pattern to redirect a waveform from the BS to the UE is one of: information defining the third RIS pattern that the RIS can use to redirect the waveform; or channel state information (CSI) that enables the RIS to generate the third RIS pattern to redirect the waveform.

In some embodiments, the RIS steering the beam between the BS and UE involves: the RIS redirecting third configuration information to the UE to enable the UE to receive data from the BS; and the RIS redirecting data based on the third RIS pattern from the BS to the UE based on the third RIS pattern.

In some aspects of the disclosure there is provided a method involving: a BS identifying any RISs that are in proximity to a UE; the BS transmitting first configuration information to facilitate beam steering by the RIS; and the BS transmitting a beam to the UE to be steered by the RIS.

In some embodiments, the BS transmitting the first configuration information to facilitate beam steering by the RIS involves: the BS transmitting to the UE a list of RISs that are in proximity to the UE; for a RIS that is in proximity to the UE, the BS transmitting configuration information to RIS that is used for configuring a first RIS pattern to redirect a waveform from the BS to the UE; the BS transmitting identification signaling to allow identification by the UE of the RIS that is redirecting the identification signaling after the identification signaling has been redirected to the UE by the first RIS pattern of the RIS; and the BS receiving a confirmation from the UE that the list of RISs has been received by the UE.

In some embodiments, the BS transmitting the first configuration information to facilitate beam steering by the RIS involves: the BS transmitting configuration information to the UE to enable the UE to set up channel measurement; for a RIS that is in proximity to the UE, the BS transmitting configuration information to the RIS that is used for configuring a second RIS pattern for channel measurement to redirect a waveform from the BS to the UE; the BS transmitting a reference signal to allow channel estimation by the UE for the channel that is used between the BS and the UE via the RIS that is redirecting the reference signal; and the BS receiving a channel measurement report from the UE based on the reference signal transmitted by the BS and redirected by the RIS based on the second RIS pattern.

In some embodiments, the BS transmitting the first configuration information to facilitate beam steering by the RIS involves: for a RIS that is in proximity to the UE, the BS transmitting configuration information to the RIS including: information that is used for configuring a third RIS pattern to redirect a waveform from the BS to the UE; and a short term activation of the RIS for communication with the UE; the BS transmitting configuration information to the UE to enable the UE to receive data from the BS; and the BS transmitting data to the UE that is redirected by the RIS based on the third RIS pattern.

In some embodiments, the BS transmitting the first configuration information to the UE to enable the UE to receive data from the BS includes the BS sending physical layer control signaling to the UE.

In some embodiments, the information that is used for configuring a third RIS pattern to redirect a waveform from the BS to the UE is one of: information defining the third RIS pattern that the RIS can use to redirect the waveform; or channel state information (CSI) that enables the RIS to generate the third RIS pattern to redirect the waveform.

In some aspects of the disclosure there is provided a method involving: a UE being notified by a BS of any RISs that are in proximity to the UE; the UE receiving first configuration information to set up a link with the BS via at least one RIS that is in proximity to the UE; and the UE receiving a beam from the BS that has been steered by the RIS.

In some embodiments, the UE being notified by a BS of any RISs that are in proximity to the UE involves: the UE receiving from the BS a list of RISs that are in proximity to the UE; the UE receiving identification signaling from the BS to allow identification by the UE of the RIS that is redirecting the identification signaling after the identification signaling has been redirected to the UE by the first RIS pattern of the RIS; and the UE transmitting a confirmation to the BS that the list of RISs has been received by the UE.

In some embodiments, the UE receiving the first configuration information to set up a link with the BS via at least one RIS that is in proximity to the UE includes: the UE receiving configuration information from the BS to enable the UE to set up channel measurement; the UE receiving a reference signal to allow channel estimation for a channel that is used between the BS and the UE via the RIS that is redirecting the reference signal; and the UE transmitting a channel measurement report to the BS based on the reference signal received by the UE that is redirected by the RIS.

In some embodiments, the UE receiving the first configuration information to set up the link with the BS via at least one RIS that is in proximity to the UE includes: the UE receiving configuration information from the BS to enable the UE to receive data from the BS; and the BS transmitting data to the UE that is redirected by the RIS.

In some embodiments, the UE receiving the first configuration information from the BS to enable the UE to receive data from the BS includes the UE receiving physical layer control signaling from the BS.

In some embodiments, the information that is used for configuring a third RIS pattern to redirect a waveform from the BS to the UE is one of: information defining the third RIS pattern that the RIS can use to redirect the waveform; or channel state information (CSI) that enables the RIS to generate the third RIS pattern to redirect the waveform.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
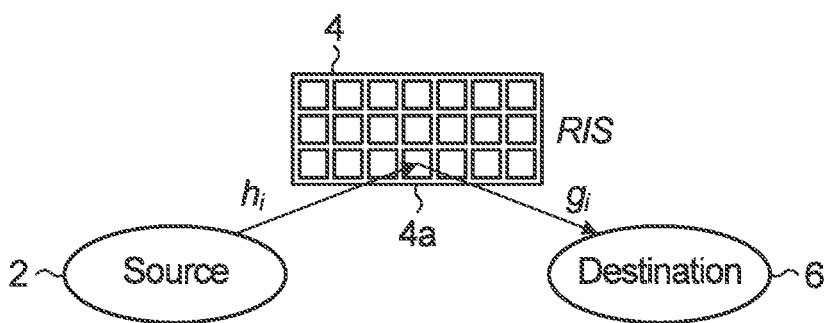
FIG. 1 is a schematic diagram of a transmission channel between a source and destination in which a planar array of configurable elements is used to redirect signals according to an aspect of the disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Controllable metasurfaces are referred to by different names such as reconfigurable intelligent surface (RIS), large intelligent surface (LIS), intelligent reflecting surface (IRS), digitally controlled surface (DCS), intelligent passive mirrors, and artificial radio space. While in subsequent portions of this disclosure RIS is used most frequently when referring to these metasurfaces, it is to be understood then this is for simplicity and is not indented to limit the disclosure.

A RIS can realize smart radio environment or "smart radio channel" i.e. the environment radio propagation properties can be controlled to realize personalized channel for desired communication. The RIS may be established among multiple base stations to produce large scale smart radio channels that serve multiple users. With a controllable environment, RISs may first sense environment information and then feeds it back to the system. According to his date, the system may optimize transmission mode and RIS parameters through smart radio channels, at the transmitter, channel and receiver.

Because of the beamforming gains associated with RISs, exploiting smart radio channels can significantly improve link quality, system performance, cell coverage, and cell edge performance in wireless networks. Not all RIS panels use the same structure. Different RIS panels may be designed with various phase adjusting capabilities that range from continuous phase control, to discrete control with a handful of levels.

Another application of RISs is in transmitters that directly modulate incident radio wave properties, such as phase, amplitude polarization and/or frequency without the need for active components as in RF chains in traditional MIMO transmitters. RIS based transmitters have many merits, such as simple hardware architecture, low hardware complexity, low energy consumption and high spectral efficiency. Therefore, RIS provides a new direction for extremely simple transmitter design in future radio systems.

RIS assisted MIMO also may be used to assist fast beamforming with the use of accurate positioning, or to conquer blockage effects through CSI acquisition in mmWave systems. Alternatively, RIS assisted MIMO may be used in non-orthogonal multiple access (NOMA) in order to improve reliability at very low SNR, accommodate more users and enable higher modulation schemes. RIS is also applicable to native physical security transmission, wireless power transfer or simultaneous data and wireless power transfer, and flexible holographic radios.

The ability to control the environment and network topology through strategic deployment of RISs, and other non-terrestrial and controllable nodes is an important paradigm shift in MIMO system, such as 6G MIMO. Such controllability is in contrast to the traditional communication paradigm, where transmitters and receivers adapt their communication methods to achieve the capacity predicted by information theory for the given wireless channel. Instead, by controlling the environment and network topology, MIMO aims to be able to change the wireless channel and adapt the network condition to increase the network capacity.

One way to control the environment is to adapt the topology of the network as the user distribution and traffic pattern changes over time. This involves utilizing HAPs, UAVs and drones when and where it is necessary.

RIS-assisted MIMO utilizes RISs to enhance the MIMO performance by creating a smart radio channels. To extract full potential of RIS-assisted MIMO, a system architecture and more efficient scheme are provided in the present disclosure.

Comparing with beamforming at transmit or receiver sides, spatial beamforming at RIS has more flexibility to realize the beamforming gain as well as to avoid the blockage fading between the transmitter and receiver, which is more favorable for high frequency MIMO communication.

An RIS may include many small reflection elements, often comparable in size with the wavelength (for example, from 1/10 to a couple of wavelengths). Each element may be controlled independently. The control mechanism may be, for example, a bias voltage or a driving current, to change the characteristics of the element. The combination of the control voltages for all elements (and hence the effective response) may be referred to as the RIS pattern. This RIS pattern may control the behavior of the RIS including at least one of the width, shape and direction of the beam, which is referred to as the beam pattern.

The controlling mechanism of the RIS often is through controlling the phase of a wavefront incident on the surface and reflected by the surface. Other techniques of controlling the RIS include attenuating reflection of the amplitude to reduce the reflected power and "switching off" the surface. Attenuating the power and switching off the surface can be realized by using only a portion of the RIS, or none of the RIS, for reflection while applying a random pattern to the rest of the panel, or a pattern that reflects the incident wavefront in a direction that is not in a desired direction. Reflecting a signal between two devices, a transmitter and a receiver, either of which can be a BS, UE, or relay, may also be considered steering the signal.

In some portions of this disclosure, RIS may be referred to as a set of configurable elements arranged in a linear array or a planar array. Nevertheless, the analysis and discussions are extendable to other two or three dimensional arrangements (e.g., circular array). A linear array is a vector of N configurable elements and a planar array is a matrix of N×M configurable elements, where M and N are non-zero integers. These configurable elements have the ability to redirect a wave/signal that is incident on the linear or planar array by changing the phase of the wave/signal. The configurable elements are also capable of changing the amplitude, polarization, or even the frequency of the wave/signal. In some planar arrays these changes occur as a result of changing bias voltages that controls the individual configurable elements of the array via a control circuit connected to the linear or planar array. The control circuit that enables control of the linear or planar array may be connected to a communications network that base stations and UEs communicating with each other are part of. For example, the network that controls the base station may also provide configuration information to the linear or planar array. Control methods other than bias voltage control include, but are not limited to, mechanical deformation and phase change materials.

Because of their ability to manipulate the incident wave/signal, the low cost of these types of RIS, and because these types of RIS require small bias voltages, RIS have recently received heightened research interest in the area of wireless communication as a valuable tool for beamforming and/or modulating communication signals. A basic example for RIS utilization in beamforming is shown in FIG. 1 where each RIS configurable element 4a (unit cell) can change the phase of the incident wave from source such that the reflected waves from all of the RIS elements are aligned to the direction of the destination to increase or maximize its received signal strength (e.g. maximize the signal to noise ratio (SNR)). Such a reflection via the RIS may be referred to as reflect-array beamforming. In some embodiments, the planar array of configurable elements, which may be referred to as an RIS panel, can be formed of multiple co-planar RIS sub-panels. In some embodiments, the RIS can be considered as an extension of the BS antennas or a type of distributed antenna. In some embodiments, the RIS can also be considered as a type of passive relay.

Introduction of controllable metasurfaces in a wireless network can increase the flexibility and reliability of the networks. Recently there has been a surge in interest in RIS utilization in wireless networks. However, much of this interest has been focused on measurement and channel state information (CSI) acquisition related to the RIS and how to optimize the RIS pattern for particular circumstances, capabilities and measurement accuracies.

Aspects of the present disclosure provide a framework of utilizing RIS panels in the wireless network to take advantage of the RIS capabilities, intelligence, coordination and speed, and thereby propose solutions having different signaling details and capability requirements. Embodiments for the framework described herein provide mechanisms for identification, setup, signaling, control mechanism and communication of a communication network that includes RIS.

FIG. 1 illustrates an example of a planar array of configurable elements, labelled in the figure as RIS 4, in a channel between a source 2, or transmitter, and a destination 6, or receiver. The channel between the source 2 and destination 6 include a channel between the source 2 and RIS 4 identified as $h_i$ and a channel between the RIS 4 and destination 6 identified as $g_i$ for the $i^{th}$ RIS configurable element (configurable element 4a) where i∈{1,2,3, . . . , N*M} assuming the RIS consists of N*M elements or unit cells. A wave that leaves the source 2 and arrives at the RIS 4 can be said to be arriving with a particular AoA. When the wave is reflected or redirected by the RIS 4, the wave can be considered to be leaving the RIS 4 with a particular AoD.

While FIG. 1 has two dimensional planar array RIS 4 and shows a channel $h_i$ and a channel $g_i$, the figure does not explicitly show an elevation angle and azimuth angle of the transmission from the source 2 to RIS 4 and the elevation angle and azimuth angle of the redirected transmission from the RIS 4 to the destination 6. In the case of a linear array, there may be only one angle to be concerned about, i.e. the azimuth angle.

In wireless communications, the RIS 4 can be deployed as 1) a reflector between a transmitter and a receiver, as shown in FIG. 1, or as 2) a transmitter (integrated at the transmitter) to help implement a virtual MIMO system as the RIS helps to direct the signal from a feeding antenna.

Figure 2A:
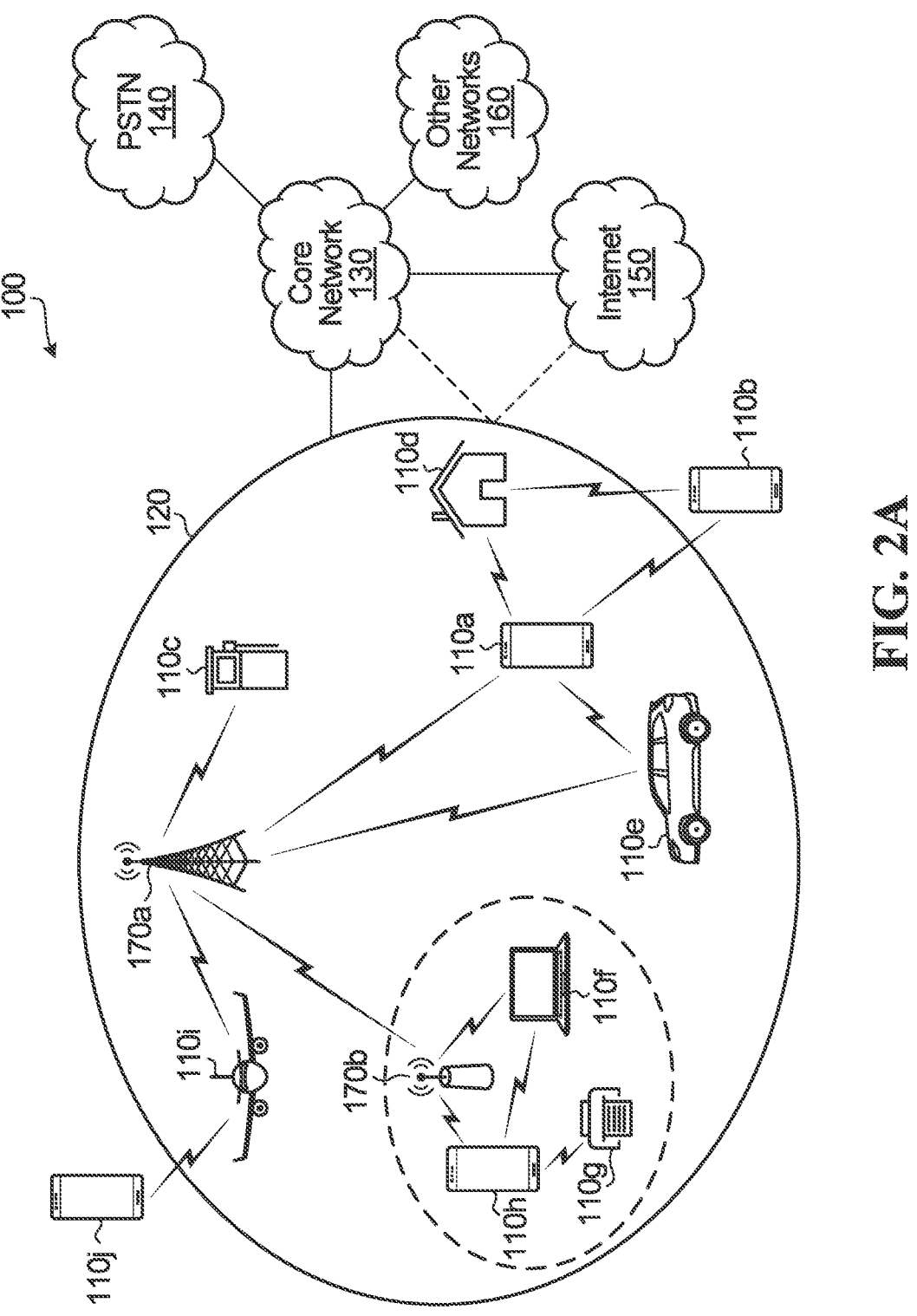
FIG. 2A is a schematic diagram of a communication system in which embodiments of the disclosure may occur.

FIGS. 2A, 2B, 3A, 3B and 3C following below provide context for the network and device that may be in the network and that may implement aspects of the present disclosure. Referring to FIG. 2A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2B:
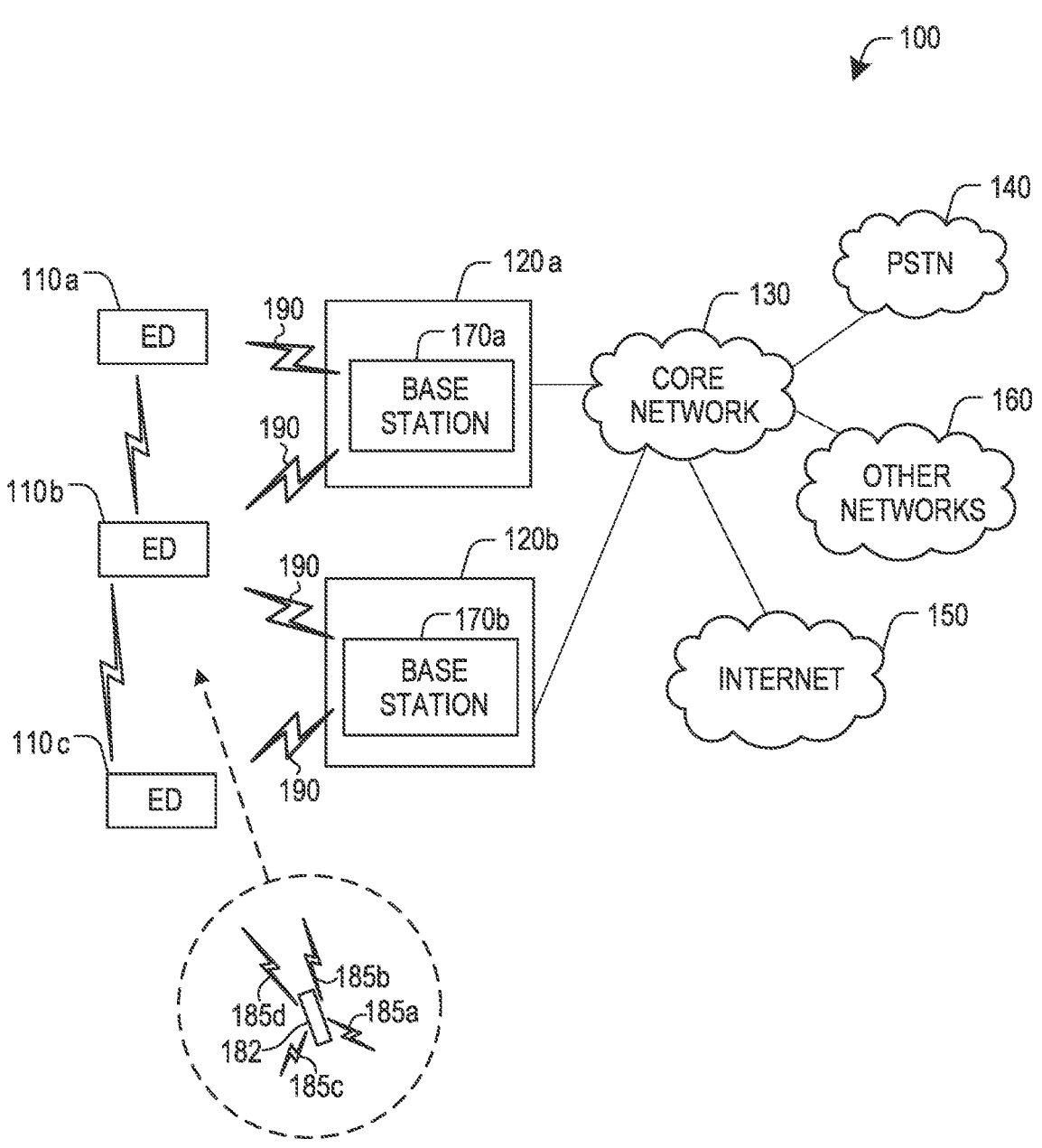
FIG. 2B is another schematic diagram of a communication system in which embodiments of the disclosure may occur.

FIG. 2B illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2B, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 2B illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2B, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2B, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router.

In some examples, one or more of the base stations 170a-170b may be a terrestrial base station that is attached to the ground. For example, a terrestrial base station could be mounted on a building or tower. Alternatively, one or more of the base stations 170a-170b may be a non-terrestrial base station that is not attached to the ground. A flying base station is an example of the non-terrestrial base station. A flying base station may be implemented using communication equipment supported or carried by a flying device. Non-limiting examples of flying devices include airborne platforms (such as a blimp or an airship, for example), balloons, quadcopters and other aerial vehicles. In some implementations, a flying base station may be supported or carried by an unmanned aerial system (UAS) or an unmanned aerial vehicle (UAV), such as a drone or a quadcopter. A flying base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station.

Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the operation and/or embodiments described herein. In the embodiment shown in FIG. 2B, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access operation, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include operation for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Also shown in FIG. 2B is a RIS 182 located within the serving area of base station 170b. A first signal 185a is shown between the base station 170b and the RIS 182 and a second signal 185b is shown between the RIS 182 and the ED 110b, illustrating how the RIS 182 might be located within the uplink or downlink channel between the base station 170b and the ED 110b. Also shown is a third signal 185c between the ED 110c and the RIS 182 and a fourth signal 185d is shown between the RIS 182 and the ED 110b, illustrating how the RIS 182 might be located within the SL channel between the ED 110c and the ED 110b.

While only one RIS 182 is shown in FIG. 2B, it is to be understood that any number of RIS could be included in a network.

Figure 3A:
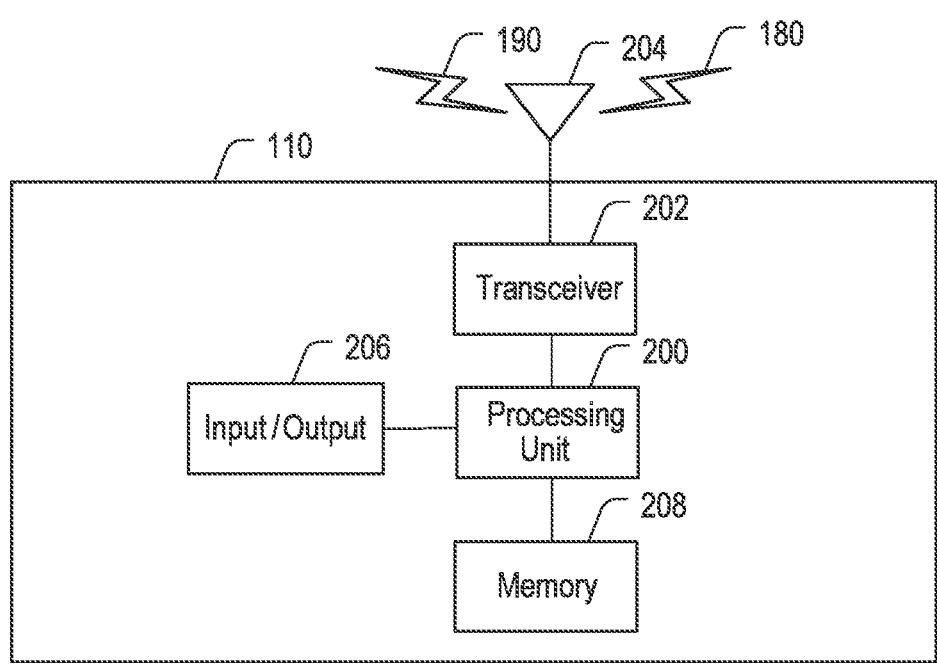
FIGS. 3A, 3B and 3C are block diagrams of an example user equipment, base station and RIS, respectively.
Figure 3B:
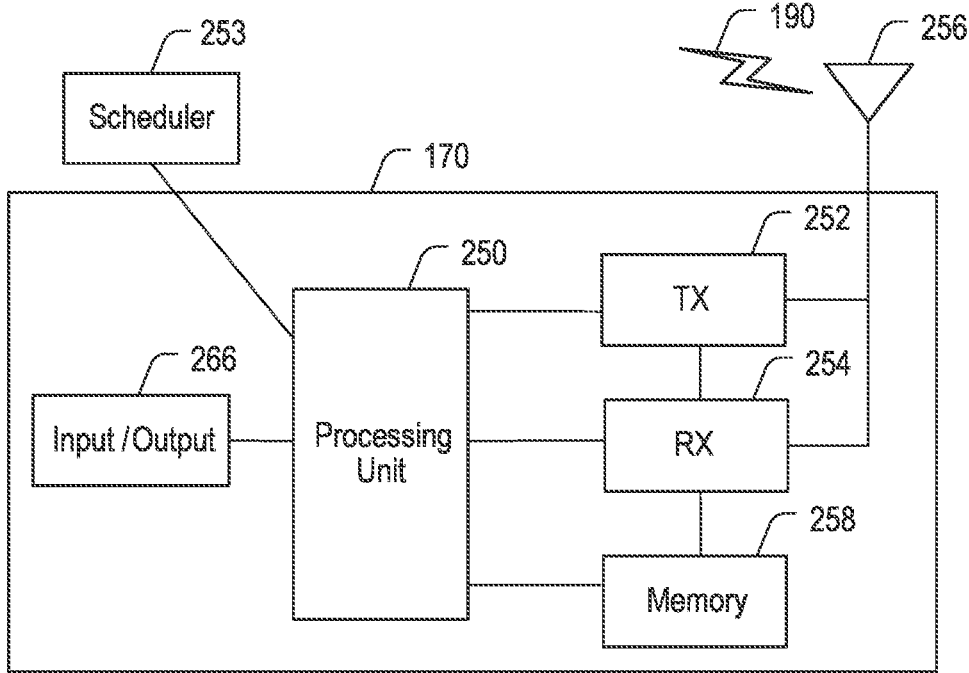

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the operations and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the operations and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the operations and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 3C:
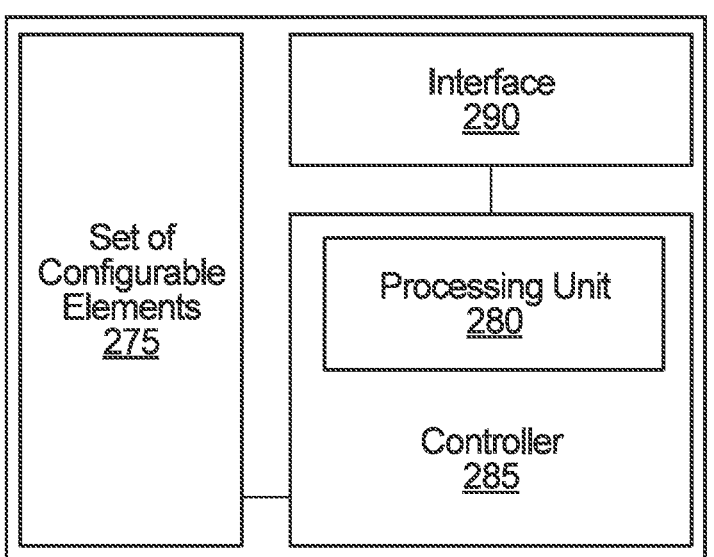

FIG. 3C illustrates an example RIS device that may implement the methods and teachings according to this disclosure. In particular, FIG. 3C illustrates an example RIS device 182. These components could be used in the system 100 or in any other suitable system.

As shown in FIG. 3C, the RIS device 182, which may also be referred to as a RIS panel includes a controller 285 that includes at least one processing unit 280, an interface 290, and the RIS, which may be considered to be a set of configurable elements 275. The set of configurable elements are arranged in a single row or a grid or more than one row, which collectively form the reflective surface of the RIS panel. The configurable elements can be individually addressed to alter the direction of a wavefront that impinges on each element. RIS reflection properties (such as beam direction, beam width, frequency shift, amplitude, and polarization) are controlled by RF wavefront manipulation that is controllable at the element level, for example via the bias voltage at each element to change the phase of the reflected wave. This control signal forms a pattern at the RIS. To change the RIS reflective behavior, the RIS pattern needs to be changed.

Connections between the RIS and a UE can take several different forms. In some embodiments, the connection between the RIS and the UE is a reflective channel where a signal from the BS is reflected, or redirected, to the UE or a signal from the UE is reflected to the BS. In some embodiments, the connection between the RIS and the UE is a reflective connection with passive backscattering or modulation. In such embodiments a signal from the UE is reflected by the RIS, but the RIS modulates the signal by the use of a particular RIS pattern. Likewise, a signal transmitted from the BS may be modulated by the RIS before it reaches the UE. In some embodiments, the connection between the RIS and the UE is a network controlled sidelink connection. This means that that the RIS may be perceived by the UE as another device like a UE, and the RIS forms a link similar to two UEs, which is scheduled by the network. In some embodiments, the connection between the RIS and the UE is an ad hoc in-band/out-of-band connection.

A RIS device or a RIS panel is generally considered to be the RIS and any electronics that may be used to control the configurable elements and hardware and/or software used to communication with other network nodes. However, the expressions RIS, RIS panel and RIS device may be used interchangeably in this disclosure to refer to the RIS device used in a communication system.

The processing unit 280 implements various processing operations of the RIS 182, such as receiving the configuration signal via interface 290 and providing the signal to the controller 285. The processing unit 280 could, for example, include a microprocessor, microcontroller, digital signal processor, field programmable gate array, or application specific integrated circuit.

While this is a particular example of an RIS, it should be understood that the RIS may take different forms and be implemented in different manner than shown in FIG. 3C. The RIS 182 ultimately needs a set of configurable elements that can be configured as described to operate herein.

FIG. 3C includes an interface 290 to receive configuration information from the network. In some embodiments, the interface 290 enables a wired connection to the network. The wired connection may be to a base station or some other network-side device. In some embodiments, the wired connection is a propriety link, i.e. a link that is specific to a particular vendor or supplier of the RIS equipment. In some embodiments, the wired connection is a standardized link, e.g., a link that is standardized such that anyone using the RIS uses the same signaling processes. The wired connection may be an optical fiber connection or metal cable connection. In some embodiments, the interface 290 enables a wireless connection to the network. In some embodiments, the interface 290 may include a transceiver that enables RF communication with the base station or with the UE. In some embodiments, the wireless connection is an in-band propriety link. In some embodiments, the wireless connection is an in-band standardized link. The transceiver may operate out of band or using other types of radio access technology (RAT), such as Wi-Fi or BLUETOOTH. In some embodiments, the transceiver is used for low rate communication and/or control signaling with either the UE or the base station. In some embodiments, the transceiver is an integrated transceiver such as an LTE, 5G, or 6G transceiver for low rate communication. In some embodiments, the interface could be used to connect a transceiver or sensor to the RIS.

Examples of how the RIS can be discovered in a network, a BS-RIS link set up, a RIS-UE link identified, the RIS-UE link setup, the RIS and the RIS-UE link activated and deactivated will be described in further detail below. However, before those examples, FIGS. 4A, 4B and 4C shown come examples of how an RIS may be arranged in a telecommunication network to create a RIS assisted link between a BS and one or more UE.

As explained above, the phase shifts that occur due to the configurable elements of the RIS depend on the frequency of the incident wave in addition to the bias voltage used to control the RIS. The following description explains how such phenomena can impact a reflected signal from the RIS between a transmitter and a receiver.

Depending on the type of material used in the RIS, a range of phase shift can be obtained within a particular bias voltage range for a first frequency, but a similar range of phase shift for a second frequency may need a different bias voltage range having different start and end voltages. For example, in a particular type of RIS material, at a frequency of 121.5 GHz, almost the full range of the phase shift is obtained with the voltage range between 1.6 volt and 2.7 volt while other applied voltages cause almost a constant phase shift. However, at a frequency of 126 GHZ, almost the full range of the phase shift is obtained with the voltage range between 1 volt and 1.6 volt. Hence, for this type of RIS, a different and separate range of bias voltages need to be applied at different frequencies in order to obtain the required phase shift. This is more evident when the differ-ence between the frequencies is a large difference. Based on the differences between different types of RISs, it may be beneficial that the RIS is able to generate its own RS patterns that are used to redirect wavefronts from a transmitter to a receiver, with additional input of relevant information from the network, transmitter, and/or receiver.

Figure 4A:
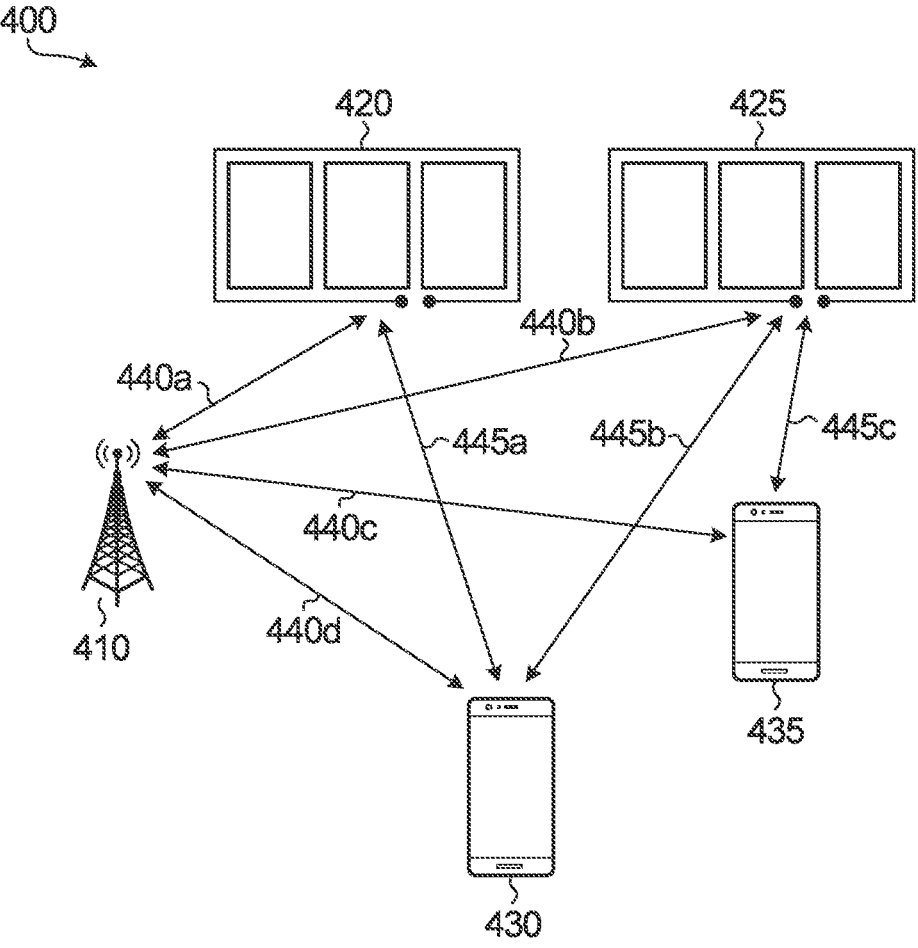
FIG. 4A is a schematic diagram of a portion of a network including a base station (BS), two reflecting intelligent service (RIS) and two user equipment (UEs) according to an aspect of the application.
Figure 4B:
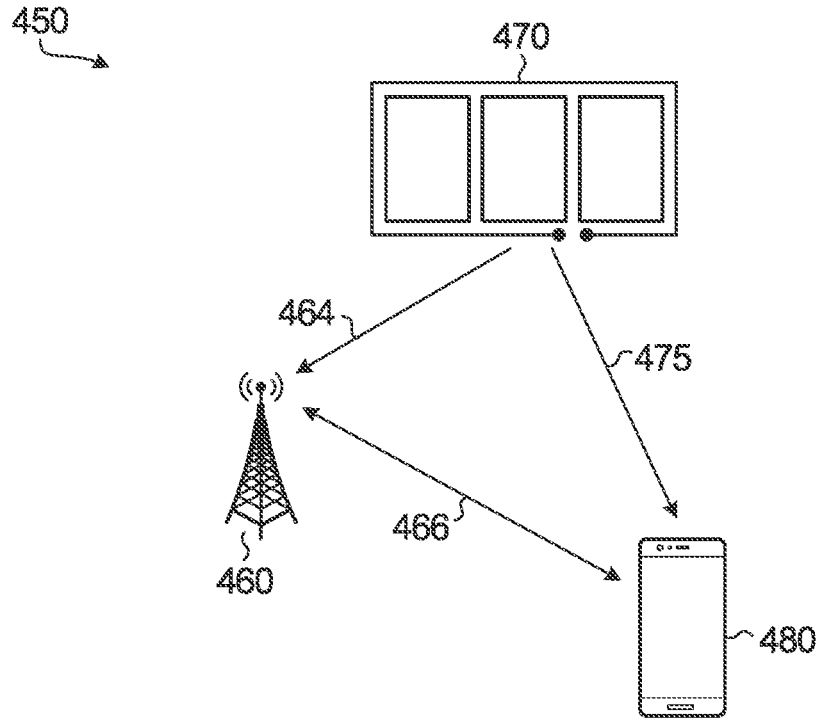
FIG. 4B is a schematic diagram of a portion of a network including a BS, a RIS and one UE according to an aspect of the application.
Figure 4C:
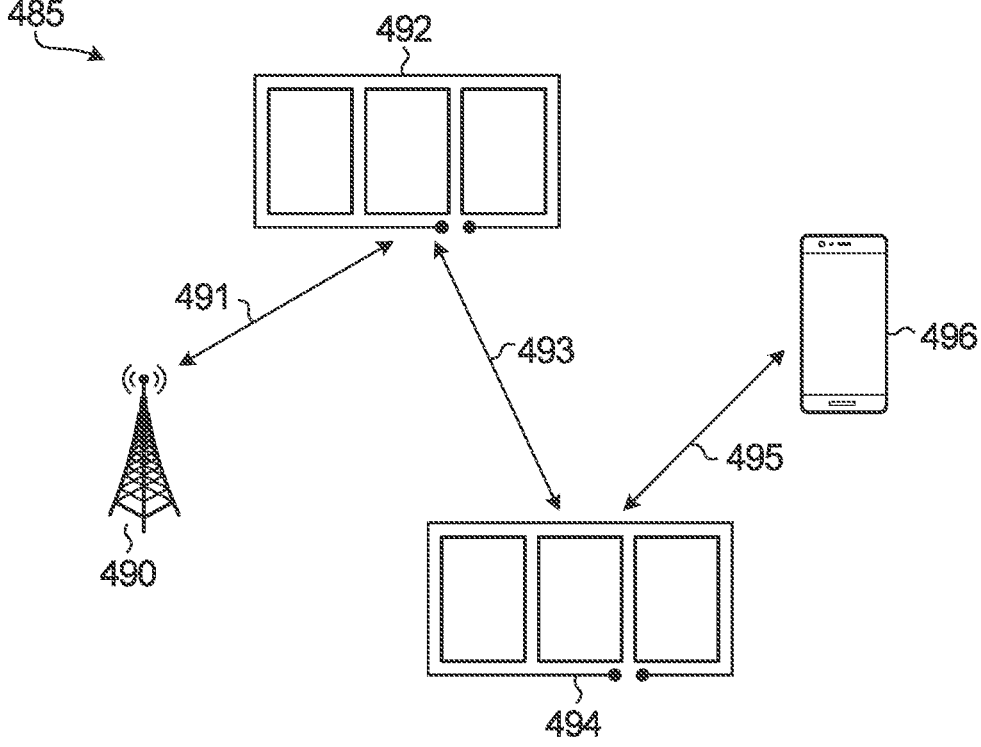
FIG. 4C is a schematic diagram of a portion of a network including a BS, two RIS and one UEs according to an aspect of the application.

FIG. 4A shows an example of a portion of a communi-cations network 400 that includes a base station (BS) 410, two RIS (RIS #1 420 and RIS #2 425) and two user equipments (UE #1 430 and UE #2 435). Each of RIS #1 420 and RIS #2 425 are capable of operating as an extension of antennas of the BS 410 for the purposes of transmission or reception, or both. The RIS are capable of reflecting and focusing a transmission wavefront propagating between the BS 410 and the UEs. The BS 410 is capable of communi-cating with the UEs via RIS. A first link 440a, for example, radio frequency RF link, is shown between RIS #1 420 and BS 410. A second link 445a is shown between RIS #2 425 and BS 410. The BS and the RIS can communicate in band, out of band or through a wired connection when commu-nicating information about the RIS pattern that the RIS should use to reflect information, as well as other configu-ration information or control information, or both, that may need to be communicated between the RIS and BS.

A third link 440b is shown between RIS #1 420 and UE #1 430. A fourth link 445b is shown between RIS #2 425 and UE #1 430. A fifth link 445c is shown between RIS #2 425 and UE #2 435. The RIS and the UE can communicate in band, out of band or using other radio access technology (RAT) that is available to the devices when communicating information about the RIS pattern that the RIS should use to reflect information, as well as other configuration informa-tion or control information, or both, that may need to be communicated between the RIS and UE.

There is also a direct link 440d shown between the BS 410 and UE #1 430 and a direct link between the BS 410 and UE #2 435. The direct link between the BS and the UEs can be in a different frequency band than the link between the BS and UEs that occurs via the RIS.

As can be seen, the RIS #1 420 has formed a physical channel between BS 410 and UE #1 430 and RIS #2 425 has formed a physical channel between BS 410 and UE #1 430 and between BS 410 and UE #2 435. It is to be understood that an RIS can have a link with multiple UEs and with multiple BSs, even though not shown in FIG. 4. Further-more, while only 1 BS, 2 RIS and 2 UEs are shown in FIG. 4, it is to be understood that this is merely an illustrative example and that there can be a single BS, RIS and UE or multiple (i.e. more than just 2) of each component could be in a communications network.

There are multiple RIS assisted communication modes that can occur between the BS, RIS and UE. Various communication modes will be described with regard to a single BS, a single UE and a single RIS that can be used to form a link between the BS and UE as shown in FIG. 4B. FIG. 4B shows a second example of a portion of a commu-nications network 450 that includes a BS 460, a RIS 470 and a single user equipment (UE 480). The RIS 470 is capable of operating as an extension of antennas of the BS 460 for the purposes of transmission or reception. The RIS 470 is capable of reflecting and focusing a transmission wavefront propagating between the BS 460 and the UE 480. The BS 460 is capable of communicating with the UE 480 via RIS 470. A first radio frequency link 464 is shown between the RIS 470 and the BS 460. The BS and the RIS can commu-nicate in band, out of band or through a wired connection when communicating information about the RIS pattern that the RIS should use to reflect information, as well as other configuration information or control information, or both, that may need to be communicated between the RIS and BS.

A second link 475 is shown between the RIS 470 and the UE 480. The RIS and the UE can communicate in band, out of band or using other RAT that is available to the devices when communicating information about the RIS pattern that the RIS may use to reflect information, as well as other configuration information or control information, or both, that is communicated between the RIS and UE.

There is also a direct link 466 shown between the BS 460 and the UE 480. The direct link between the BS and the UE can be in a different frequency band than the link between the BS and UE that occurs via the RIS.

As can be seen, the RIS 470 has formed a physical link between the BS 460 and UE 480. It is to be understood that an RIS can have a link with multiple UEs and with multiple BSs, even though not shown in FIG. 4B. Furthermore, while only one BS, one RIS and one UE are shown in FIG. 4B, it is to be understood that this is merely an illustrative example and that multiple of each component could be in a commu-nications network.

In some embodiments, the RIS may have a transceiver that can be used for low rate (an example of which is a microwave band below 6 GHz) communication and control signaling with either the UE or the BS.

The RIS panels may have coverage overlap with one another such that a group of users may be covered by multiple RIS. This includes coverage overlap with a cover-age area of a donor BS or other BSs. A donor BS is considered a BS that transmits and receives signaling with a UE. The donor BS for the one or more RIS panels can be the same BS or multiple different BSs.

In some embodiments, RIS panels can be positioned such that they reflect signals to each other in the case of a multi-hop reflection. For example, the BS can transmit to a first RIS, which reflects to a second BS, that reflects to a UE. FIG. 4C illustrates a portion of a network including a BS 490, two RIS 492 and 494 and a single UE. A first link 491 is shown between the BS 490 and RIS #1 492. A second link 493 is shown between RIS #1 492 and RIS #2 494. A third link 495 is shown between RIS #2 494 and UE 496. The BSs and the RISs can communicate in band, out of band or through a wired connection when communicating information about the RIS pattern that the RIS should use to reflect information, as well as other configuration information or control information, or both, that may need to be communicated between the RIS and BS.

Using one or more RIS to reflect signaling between one or more BSs and one or more UEs can provided multiple benefits. In some embodiments, the use of an RIS can provide diversity enhancement by creating multiple independent communication paths for increased link reliability. In some embodiments, the use of an RIS can be operated on a semi-static manner allowing a longer-term association of the RIS to a UE. In some embodiments, the use of an RIS can be operated on a dynamic allowing dynamic RIS selection.

Figure 5:
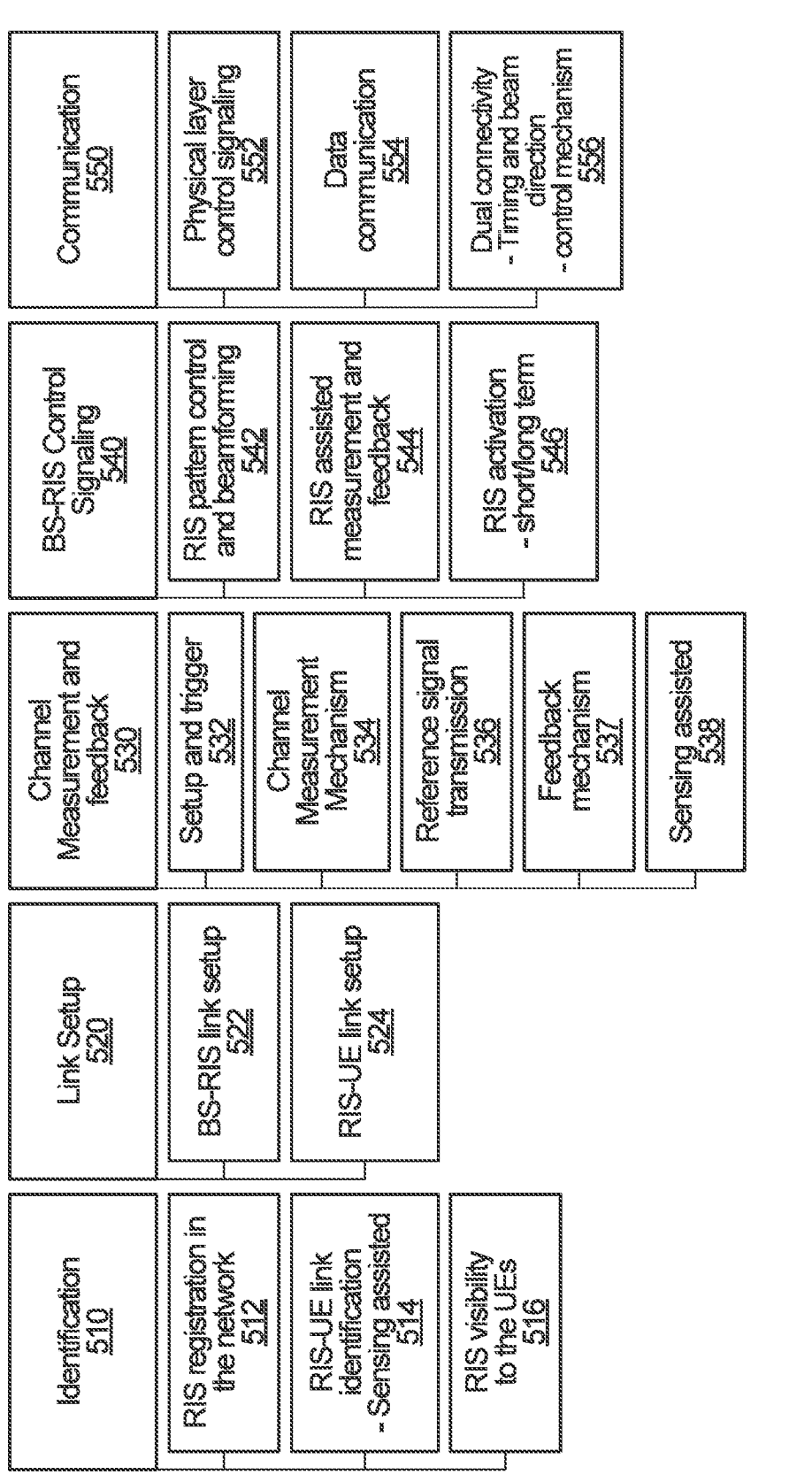
FIG. 5 is a schematic diagram of operations of a framework according to an aspect of the application.

FIG. 5 illustrates multiple operations of a RIS in a wireless communication network of an embodiment provided in the present disclosure. The operations include at least one of: 1) identification 510 of the RIS within the network, 2) link setup 520 between a BS and a RIS and between the RIS and a UE, 3) Channel measurement and feedback 530 that allows channel estimation to be performed, 4) RIS control signaling 540 to configure a RIS pattern on the RIS to redirect a signal between the BS and UE and activate the RIS when the RIS is to be used and 5) communication 550 that involves physical layer control signaling for configuring the UE when the link is activated and for transmission of data communication between the BS and UE via the RIS. Each of these operations have associated methods that can be performed by the base station, by the RIS and/or by the UE. Examples of such methods will be described in further detail below. In some embodiments, all of the methods may be used to implement the discovery of an RIS and setting up and activating a link between the BS and UE for use as desired. However, the various methods can be used independently for an intended use whenever necessary. In some embodiments, the link between the BS and the RIS and the link between RIS and UE may share the same frequency band or occupy different frequency bands (for example different carriers or different bandwidth parts). In some embodiments, the link between the BS and the RIS may be considered and treated as a backhaul link.

Within the scope of the identification operation 510 are different types of identification that are performed in deployment of the RIS. One feature of the identification operation 510 pertains to RIS registration 512 in the network. RIS registration may also be referred to as RIS discovery, RIS identification or RIS recognition and involves the RIS being identified by the network. Another feature of the identification operation 510 pertains to identification operation 514 of a RIS-UE link in the network for any UEs that may be in proximity to the RIS. Another feature of the identification operation 510 pertains to RIS visibility with regard to the UEs 516 in the network. Depending on whether the UE knows whether the RIS is in the link redirecting signals from the BS, or not, can affect how the RIS-UE link is identified. Example methods of the various features related to the identification 510 operation, as performed by the base station, by the RIS and by the UE, will be described in detail below.

Each of these operations and features thereof are described in detail below.

The present disclosure provides the identification operation 510 below in some embodiments.

When the RIS is deployed in the network, the RIS has to be discovered, identified or recognized by the network in order to enable an RIS pattern on the RIS to be controlled and redirect a signal from the BS to one or more UE. When the RIS is operator deployed, for example when the operator is initially setting up a network and including the RIS in that setup, no signaling may be needed. Anytime RISs are added to the network subsequent to initial network setup has occurred, some level of control signaling may be needed to initialize the RIS within the network. Examples of the signaling will be described below. The initialization of the RIS may involve signaling to determine UE capabilities such as RIS size, RIS technology, reconfiguration speed and communication capabilities. Other signaling includes determining the type (wired, wireless, shared or private), speed, delay, jitter and reliability of the link between the RIS and the network. After the capability establishment, the network may configure the RIS with necessary configurations for communication to the network and the UEs and setup the RIS pattern. These may also be a function of the RIS capabilities. For example, signaling to configure the mechanism for RIS pattern settings is affected by the RIS capabilities, or configuration of the RIS-UE link discovery signal is impacted by the RIS transceiver capabilities.

From the UE perspective, the RIS may be considered in a number of different ways. For example, in some embodiments, the UE may not be aware that the UE is receiving signals that have been redirected by the RIS and as such the RIS may be "invisible" to the UE. In some embodiments, the RIS may be considered to be another UE and the UE can communicate with the RIS substantially using a sidelink type of capability. In some embodiments, the UE interacts with the RIS as it would interact with a BS. In some embodiments, the UE interacts with the RIS as it would interact with a hybrid relay. In some embodiments, the UE interacts with the RIS as a separate entity, such that the RIS is considered to be "visible" to the UE, and interacting with the entity involves using signaling that is based on agreed upon telecommunication standards.

From the BS perspective, the RIS may also be seen in a number of different ways. For example, the RIS may be considered to be part of the BS and may not be considered an independent entity. In some embodiments, the BS may interact with the RIS as the BS would interact with a UE that has a reflection capability. In some embodiments, the BS may interact with the RIS as the BS would interact with a remote radio head (RRH). In some embodiments, the BS may interact with the RIS as the BS would interact with a hybrid relay. In some embodiments, the BS may interact with the RIS by interacting with the RIS considered as a separate entity using signaling that is based on agreed upon telecommunication standards.

The identification operation 510 in some embodiments comprises an operation 512 of RIS Registration by the network.

An initial step in deployment of the RIS may be identification of the RIS by the network. Part of the identification of the RIS involves is forming a link between the BS and the RIS. The RIS link between the network and the RIS may be selected from a number of different types of communication media and as a result may use any of a number of different signaling mechanisms. A list of examples of the variety of communication media between the network and the RIS that is not intended to limit the disclosure, includes:

1) a wired connection such as Ethernet cable and optical
        fiber;

2) wireless in-band communication (that may include using the same frequency band or using different frequency bands, for example, a different carrier or bandwidth parts);

3) wireless out-of-band communication including use of unlicensed spectrum and other RAT such as Wi-Fi and Bluetooth; or 4) for signaling in a direction from the RIS to the BS, a passive communication mode such as backscattering and passive modulation. Backscattering may involve a wavefront impinging on the RIS being "modulated" to include information about the RIS. The modulation may constitute amplitude/phase/frequency manipulation of the signal by the configurable elements of the RIS, i.e. using an appropriate RIS set of patterns.

Discovery of the RIS includes signaling or messages exchanged between the RIS and the network, which may occur via one or more BS, may be performed using any of a variety of signaling methods. In some embodiments, a method for discovery of the RIS includes a proprietary type of signaling that is an agreed upon type of signaling between the BS and the RIS that does not use any existing standards.

In some embodiments, the RIS registration may include the network obtaining RIS capability information (such as, but not limited to, RIS material type or which RIS parameters can be controlled, response time, RIS control function/capability).

In some embodiments, the RIS identification may also include RIS localization. For example, the network can obtain RIS positioning information through sensing or positioning, meaning the position of the RIS can be determined based on signaling by the network and RIS to find one another. RIS positioning information can also help to determine possible BS-RIS links and RIS-US links.

Cellular networks were originally designed for wireless communication, and the rapidly increasing demand for location-based applications has drawn a considerable amount of attention to positioning research in cellular networks. Some of the more intriguing 6G applications involve sensing environments through high-precision positioning, mapping and reconstruction, and gesture/activity recognition. Sensing will be a new 6G service, and it can be described as the act of obtaining information about a surrounding environment. It can be realized through a variety of activities and operations, and classified into the categories of RF sensing and non-RF sensing. RF sensing involves sending a RF signal and learning the environment by receiving as well as processing the reflected signals. Non-RF sensing involves exploiting pictures and videos obtained from a surrounding environment (for example via a camera).

By sending an electromagnetic wave and receiving echoes, RF sensing is able to extract information of the objects in an environment, such as existence, texture, distance, speed, shape, and orientation. In current systems, RF sensing is limited to radar, which is used to localize, detect, and track passive objects, i.e., objects that are not registered to the network. Existing RF sensing systems have various limitations. They are stand-alone and application-driven, meaning they do not interact with other RF systems. Furthermore, they only target passive objects and cannot exploit the distinct features of active objects, i.e., objects registered to the network.

In some embodiments, the signaling or messages exchanged between the RIS and the network may be new signaling types that are specific to use for communication between the RIS and the network.

In some embodiments, a method for discovery of the RIS includes an existing signaling mechanism, such as Xn, RRC and physical downlink shared channel (PDSCH). In some embodiments, the link between the RIS and the network may be a backhaul link and be treated as such for the case of signaling on the link. In such embodiment, this may include augmenting the existing mechanisms to specifically include RRC messages to enable signaling between the BS and the RIS.

In some embodiments, RIS discovery involves the RIS sending a signal over-the-air to be discovered by network. In some embodiments, the signal is RACH based if the RIS has a transceiver to send an uplink RACH signal. In some embodiment, the RIS uses a same type of RACH mechanism as a UE. The RIS is identified as a RIS as part of the RRC setup. In some embodiments, the RACH mechanism is specifically for the RIS.

Figure 6A:
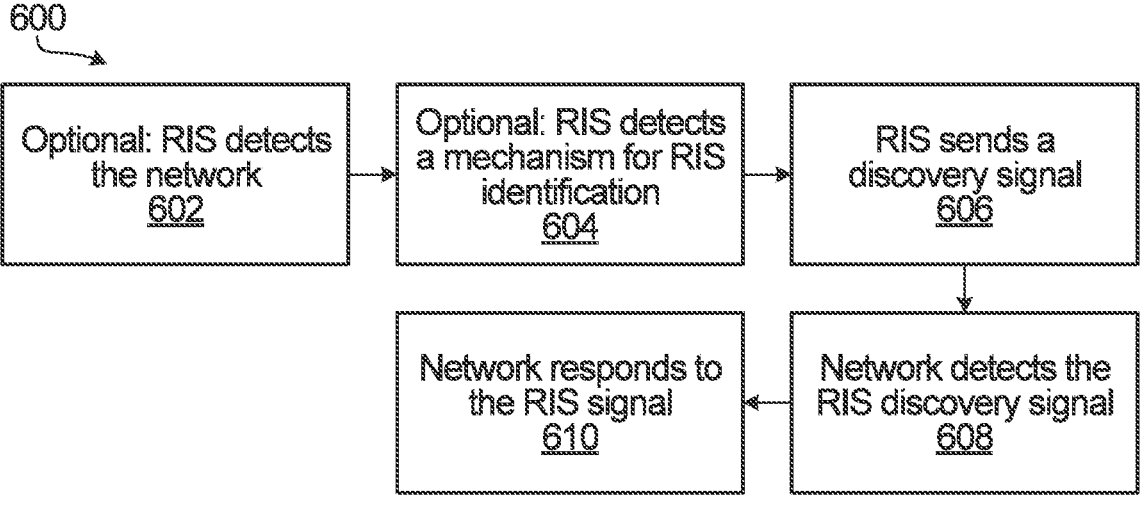
FIG. 6A is a flow diagram for RIS discovery by the network according to an aspect of the application.

FIG. 6A is a flow chart that illustrates an example of steps that may be involved in over-the-air RIS discovery 600 by the network. Step 602 is an optional step, that involves the RIS detecting the network. Step 604 involves the RIS determining the mechanism for RIS identification. Step 606 involves the RIS sending a discovery signal such as synchronization signal. Step 608 involves the network detecting the discovery signal sent by the RIS in step 606. Step 610 involves the network responding to the discovery signal, for example by setting up RIS-UE link discovery, which is further detailed in FIG. 6B.

In some embodiments, RIS discovery may be backscattering based. The RIS reflects the original signal and modulates the reflection with an RIS identifier (RIS ID). The original signal may be sent by the BS as part of RIS discovery.

In some embodiments, RIS discovery may be backhaul based discovery. For example, the RIS is connected to a wired backhaul connection and announces the relevant RIS information.

In some embodiments, RIS discovery may be manually programmed such that the RIS discovery information is manually shared with the TRP.

In some embodiments, the RIS may send a signal to be discovered by the UE. Such a signaling mechanism may be specified by a telecommunications standard and does not require configuration initiated by the BS at the RIS and/or the UE. In some embodiments, the network may configure the RIS and/or the UE for discovery.

Figure 6B:
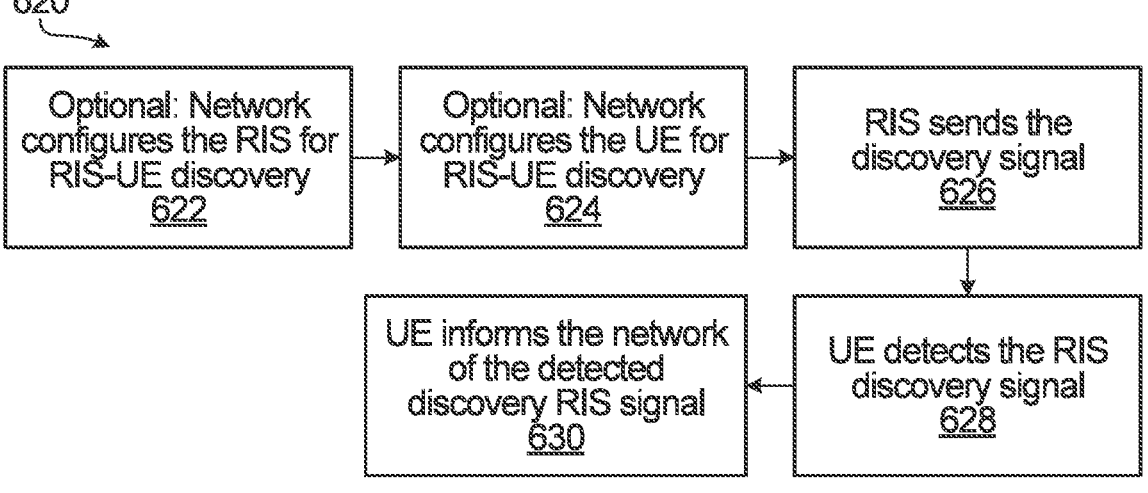
FIG. 6B is a flow diagram for RIS discovery by the UE according to an aspect of the application.

In some embodiments, if the RIS has a transceiver the RIS can discover the RIS-UE link by directly communicating with the UE as described with regard to FIG. 6B.

In some embodiments, the RIS discovery may be a regular device-to-device (D2D) discovery. For example, the RIS uses the same UE discovery mechanism as for D2D.

In some embodiments, the RIS discovery may use a discovery mechanism that is specific to UE and RIS discovery. The mechanism that is specific to UE and RIS discovery may be enhanced by sensing tools and/or network assistance such as RIS and UE list sharing, coordination sharing or ID sharing.

In some embodiments, the RIS-UE discovery may be backscattering based. The RIS reflects a signal to the UE and modulates the reflection with the RIS ID. The original signal may be sent by the BS as part of RIS-UE discovery and reflected by the RIS. Alternatively, the signal is sent by the UE and reflected by RIS. The network detects the reflected signal and informs the RIS and/or the UE about the detected signal.

FIG. 6B is a flow chart that illustrates an example of steps that may be involved in RIS discovery by the UE 620. Step 622 is an optional step that involves the network configuring the RIS for RIS-UE discovery. This may involve the BS sending configuration information to the RIS that includes information identifying UEs that might be in the proximity of the RIS, RIS pattern information that might be needed by the RIS, scheduling information, etc. Step 624 is an optional step that involves the network configuring the UE for RIS-UE discovery. This may involve the BS sending configuration information to the UE that includes information identifying RISs that might be in the proximity of the RIS and information about a discovery signal, e.g., the type of signal, scheduling information, etc. In some embodiments, step 624 is performed by the configuration information being sent directly to the UE over a UE-BS direct link or sent to the UE via a link that include reflecting the configuration information by the RIS. Step 626 involves the RIS sending a discovery signal. Step 628 involves the UE detecting the discovery signal sent by the RIS in step 626. Step 630 involves the UE informing the network of the detected discovery RIS signal.

Figure 6C:
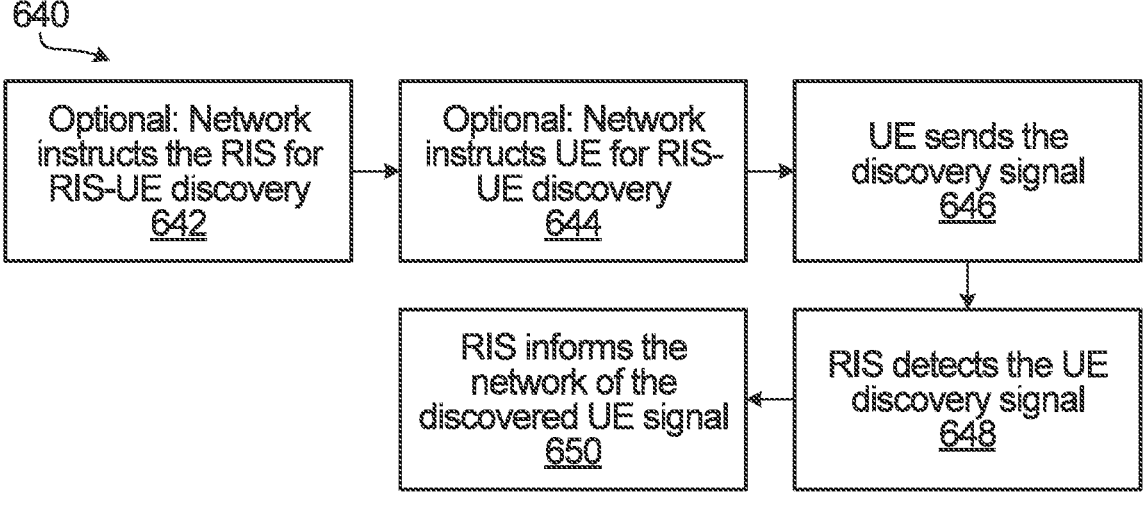
FIG. 6C is a flow diagram for UE discovery by the RIS according to an aspect of the application.

FIG. 6C is a flow chart that illustrates an example of steps that may be involved in UE discovery by the RIS 640. Step 642 is an optional step that involves the network configuring the RIS for RIS-UE discovery. This may involve the BS sending configuration information to the RIS that includes information identifying UEs that might be in the proximity of the RIS, RIS pattern information that might be needed by the RIS, scheduling information, etc. Step 644 is an optional step that involves the network configuring the UE for RIS-UE discovery. This may involve the BS sending configuration information to the UE that includes information identifying RISs that might be in the proximity of the RIS and information about a discovery signal, i.e. the type of signal, scheduling information, etc. In some embodiments, step 644 is performed by the configuration information being sent directly to the UE over a UE-BS direct link or sent to the UE via a link that include reflecting the configuration information by the RIS. Step 646 involves the UE sending a discovery signal. Step 648 involves the RIS detecting the discovery signal sent by the UE in step 646. Step 650 involves the RIS informing the network of the detected discovery RIS signal.

Once the RIS is deployed into the network, the network may be notified of the entry of the RIS into the network using initial access signaling. In some embodiments, this may be part of a "plug and play" functionality of the RIS, that allows the RIS to be deployed such that the setup is substantially automatic from the perspective of the user deploying the RIS. The initial access signaling may be an existing mechanism or an initial access mechanism specific to the RIS. An example of an initial access mechanism specific to the RIS may be RIS specific RACH sequences and RIS specific RACH channel resource allocation. In some embodiments, network nodes may be programmed with the necessary information to work with the RIS and thus skip the registration step.

After the RIS is identified, or discovered, by the network, the RIS has to be registered and fully configured by identifying links between the RIS and UE before the RIS can be used to communicate with one or more UEs. This may involve identifying links between the RIS and one or more UEs, i.e. identifying RIS-UE links.

The identification operation 510 in some embodiments comprises a RIS-UE link identification operation 514.

After the RIS is integrated into the network, for proper operation of the RIS to redirect signaling between the BS and the UE, a RIS-UE link needs to be discovered. The link between RIS and UE can share the same frequency band or occupy different frequency bands (carrier or bandwidth part). RIS-UE link discovery may also be referred to as RIS-UE link determination or RIS-UE link identification. Furthermore, discovery of the RIS-UE link may be a precursor to performing RIS-UE link setup.

In a communication system that does not necessarily use a RIS, BS-UE link identification by the network and UE sidelink identification between UEs is supported by existing standards. This RIS-UE link identification operation can identify a possible RIS and UE association, which can be used for a transmission link determination during scheduling. RIS-UE link identification can be done by sensing and localization technologies or through the detection of a reference signal by the UE by using a DL reference signal (such as SSB or CSI-RS) or by the BS using an UL reference signal (such as RACH or SRS). In such scenarios, network identification of the UE is performed through synchronization and occurs following broadcast signaling. For cell discovery, a reference signal may be transmitted to the UE to identify the cell, for example, a channel state information reference signal (CSI-RS). UE identification by the network may use an initial access mechanism and physical random access channel (PRACH). The underlying communications standard (such as 6G or New Radio (NR) standard) also provides a signaling mechanism for sidelink discovery. In some embodiments a mechanism like the sidelink discovery could be used when the RIS is to be treated as a discrete network element.

The identification operation 510 in some embodiments comprises an operation 516 of RIS Visibility to the UE.

Depending on the how the UE perceives the RIS, RIS-UE link identification can occur utilizing any of a number of different methods. In some embodiments, the RIS may be considered to be invisible to the UE, i.e. the UE simply considered the RIS as part of the network, not necessarily as a discrete node. When the RIS-UE link is for DL signaling, the RIS reflects the synchronization signal (SSB/PBCH). In an example, the RIS substantially performs like a remote radio head (RRH) from the network. The UE does not realize that the synchronization signal is reflected by the RIS. Reference signal measurement performed using particular ports or configurations, which may include CSI-RS measurement, can be used to determine whether the UE receives the original signal directly from the BS or its reflected version by the RIS. For example, if a signal is coming directly from a BS in a different direction than the reflected signal from the RIS, and particular configurations allow for receiving signals from different directions, then one direction can be associated with a signal coming directly from a BS and another direction can be associated with a signal reflected signal from the RIS. Another example, is to receive two copies of the RS in every direction. For a first copy the RIS is enabled for reflection and for the second copy, the RIS is disabled. A successful reception of both copies of the RS indicates reception of the direct transmission from the transmitter to the receiver, while a successful reception of only the first copy in one direction would indicate the reception of the reflected copy. When an uplink reference signal, such as a sounding reference signal (SRS), is used, the UE sends the SRS and the RIS detects the SRS or the RIS reflects the SRS and the BS detects the reflected signal to detect the possible link. Similar mechanisms such as those in the above examples are applicable.

In some embodiments, the RIS may be considered to be visible to the UE, i.e. the UE is made aware of the RIS and considers the RIS as a discrete node. Various methodologies will now be described where the RIS is treated in this manner by the UE.

In some embodiments, the RIS may be treated by the UE as a discrete network component, similar to another UE, such that the RIS-UE link could substantially be treated as a link between two devices where sidelink transmission could be used. When treating the RIS-UE link as sidelink, a device to device (D2D) discovery mechanism, or an enhanced mechanism, with or without the assistance of the BS, sensory information and/or other communication mechanisms or frequency bands may be used to discover the RIS. In such scenarios the RIS could be equipped with a transceiver to be able to perform D2D discovery and link setup. When a link between the RIS and UE is based on SL, the SL and Uu link (the link between the BS and the UE or between the BS and RIS) can occupy different carriers and/or different bandwidth parts.

In some embodiments, the RIS may be treated like a small BS by the UE. When treated as a small BS, the RIS may send or reflect a synchronization and/or measurement signal to the UE coverage area, such as SSB/PBCH and/or CSI-RS, which the UE can detect and measure. This may be done using an incorporated transceiver in the RIS or through the beam reflection capabilities of the RIS reflecting the original signal transmitted by a neighboring transmitter.

In some embodiments, the RIS-UE link may be determined using RIS specific discovery, i.e. a discovery mechanism that would be used specifically for discovering the RIS in a communication system, as opposed to discovery a UE, or a relay, etc. RIS specific discovery may use specific signaling that is specified in a telecommunications standard to enable UE-RIS link discovery. Such signaling mechanism may be originated at any of the BS, UE and RIS and be detected by any other of the BS, UE and RIS, depending on the underlying RIS capability, the telecommunications standard support for the devices and signaling mechanism and the configuration signaling for the devices and signaling mechanism. As an example, the RIS may reflect a set of signals in different directions while the original signal is transmitted by a BS toward the RIS and the UE detects and measures the original signal to find the RIS and the corresponding direction. In another example, the UE sends the identifying signal as configured by the BS and the RIS detects it to identify the UE and the corresponding direction.

In some embodiments, the RIS-UE link determination may be network assisted. In some embodiments with network assistance, the UE is notified with information about the RIS, such as a signal that will be transmitted by the BS and reflected by the RIS to allow the UE to identify the RIS based on receiving the signal and/or the location of the RIS. In some embodiments with network assistance, the RIS is informed by the network regarding UEs that may be in proximity of the RIS to which the RIS can form a link. When informing the RIS, the network may also inform the UE about the RIS in the proximity of the UE.

In some embodiments the RIS-UE link determination may be sensing assisted. In some embodiments with sensing assistance, the RIS and the UE can use RF based sensors or non-RF based sensors to detect each other. The integrated sensing mechanism can be used to directly or indirectly identify the link. An example for direct determination includes detecting RF sensing signals (within the same band and/or RAT or other bands or other RATs) emitted by the other node (RIS emission and UE detection or UE emission and RIS detection). Another example for direct determination includes detection of a RF sensing signal emitted by one node, reflected by the other node and detected by the original emitting node. A further example for direct determination includes using a camera to detect the presence of the other node. An example for indirect sensing is detecting the presence of the other node using a camera. For example, the UE camera may capture an image that includes the RIS and use pattern recognition to identify the RIS or detect a quick response (QR) code embedded in the RIS. Alternatively, the RIS may emit an infrared beam which can be detected by the UE for RIS identification and direction setting. In some embodiments, when sensing assistance is being used for RIS-UE link determination, additional information may be provided by the network, such as network knowledge of where the UE is currently located, UE orientation, RIS location and orientation, a map of the area to identify possible link blockage, UE and RIS capabilities, such as sensing capabilities that can include one or more of a camera, a gyroscope, a compass, and lidar. This additional information may be useful to the RIS in helping to determining where UEs are and therefore aid in the RIS-UE link determination. For example, if the RIS knows at least generally where the UE is, the UE knows where to start reflecting a signal from the BS, by using a particular RIS pattern.

In some embodiments the RIS-UE link determination may be performed using other mechanisms. Other mechanisms that could be used to identify the link include the UE and RIS detecting each other using other RATs such as a BLUETOOTH identifier (ID) or Wi-Fi beacons. If other RATs are used, then the UE and RIS need to be configured with radios capable of operating in the appropriate manner, i.e. Bluetooth radios, Wi-Fi radios, etc. These other RATs may be used in a substantially normal operating manner for establishing a link between two devices communicating via the respective RAT. In some embodiments, the RIS periodically sends a Wi-Fi beacon, and the BS informs the UEs about the service set ID (SSID) carried by the beacon. The UE then identifies the RIS within the vicinity of the UE by detecting the beacon and associated SSID. The UE and RIS may use the underlying Wi-Fi connection to establish the link. Alternatively, the UE informs the BS about the detection of the SSID and the link between RIS and UE is then established by the BS. The UE may not need to know the SSID is associated with a RIS and UE just detects the SSID and informs the BS about its detection.

FIGS. 7A to 7G provide example flow charts for different methods that may be used for RIS-UE link identification described above.

Figure 7A:
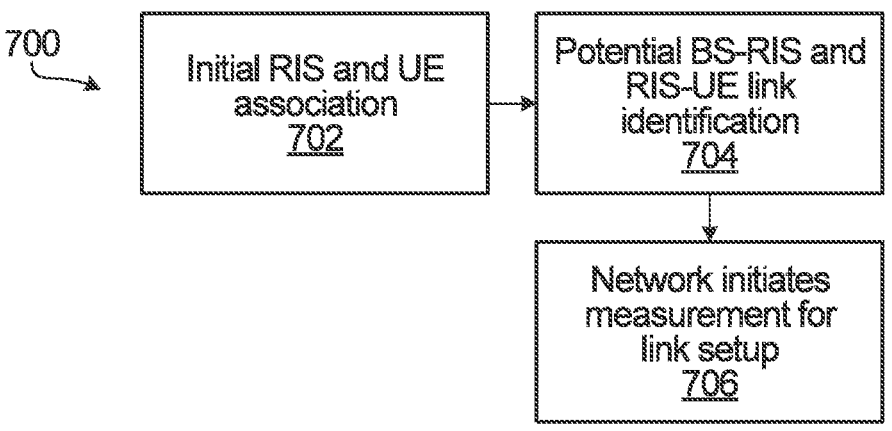
FIGS. 7A to 7G are flow diagrams illustrating different example methods for implementing identification of RIS-UE links according to aspects of the application.

FIG. 7A is a flow chart that illustrates an example of steps that may be involved in RIS-UE link identification 700 that involves BS oriented discovery. Step 702 involves performing an initial RIS and UE association. This may involve the BS performing a comparison of information stored locally, for example, in the BS memory. For example, a list of UEs and their positions may be compared with a list of RISs and their positions to determine which RISs are in proximity to which UEs. Step 704 involves the BS identifying a potential BS-RIS link and a potential RIS-UE link based on the comparison performed in step 702. Step 706 involves the network initiating a channel measurement, for example that may be used for channel estimation to determine channel quality, as part of link setup. Examples of channel measurement methods will be described below.

In a measurement-based approach for identification of candidate RIS, a BS, UE or RIS performs channel measurement to determine RIS-UE link quality. In some embodiments, RIS measurement may be performed for per hop link quality. In some embodiments, a TRP or UE performs an end-to-end channel measurement. In some embodiments, a UE can feedback measurement results to the BS. When the UE feeds back measurement results to the BS, a RIS may receive the feedback information, in determining a RIS pattern that should be used to reflect a signal to the UE or BS, depending on the direction of the signal. The RIS may need to receive configuration information from BS to be able to receive the feedback information.

In a measurement-based approach to identification of candidate RIS, the identification may be assisted by sensing information. In some embodiments, a RIS is able to sense a UE or a UE is able to sense a RIS using communication based sensing or other types of sensors. In some embodiments, when a RIS senses the UE, if the RIS does not have access to the UE identity, the network can match the sensed UE with an active UE list, and notifies the RIS and/or UEs about the potential link.

Figure 7B:
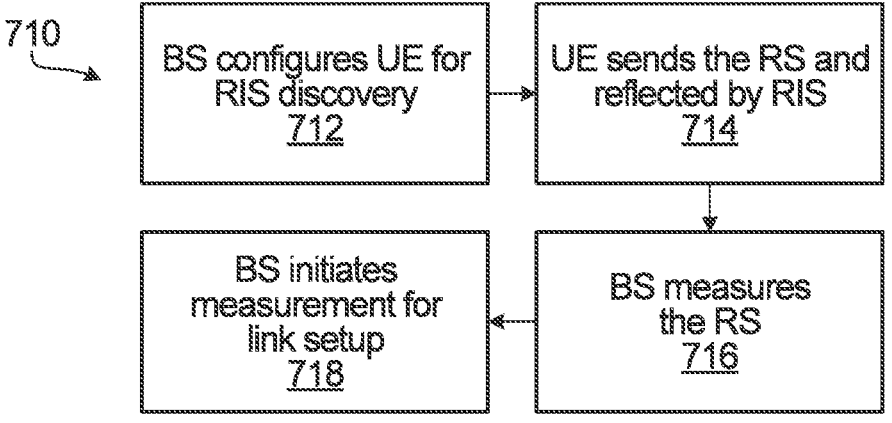

FIG. 7B is a flow chart that illustrates an example of steps that may be involved in RIS-UE link identification 710 that involves the BS performing channel measurement of a reference signal transmitted by the UE Step 712 involves the BS configuring the UE for RIS discovery. This step may involve the BS sending configuration information identifying a type of RS the UE should send that will be redirected by the RIS. In this step, the BS may also send scheduling information of when the UE should send the RS. Therefore, when the UE sends the RS the BS can identify that the RS was reflected by the RIS. Step 714 involves the UE sending the RS, which the RIS reflects to the BS. Step 716 involves the BS measuring the RS. Step 718 involves the BS initiating a channel measurement that may be used for channel estimation, as part of link setup. Examples of channel measurement methods will be described below.

Figure 7C:
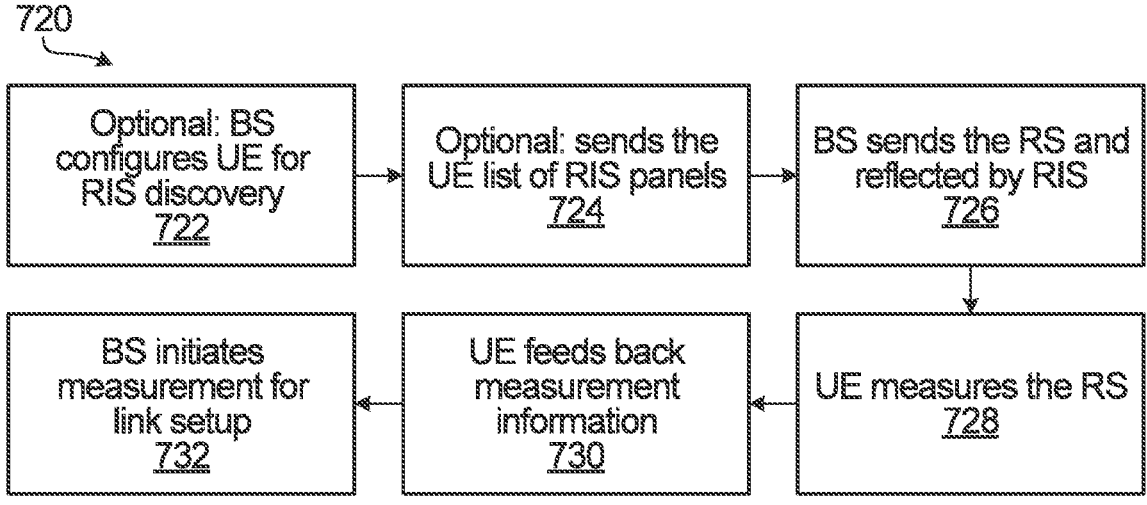

FIG. 7C is a flow chart that illustrates an example of steps that may be involved in RIS-UE link identification 720 that involves the UE performing channel measurement of a reference signal transmitted by the BS. Step 722 is an optional step that involves the BS configuring the UE for RIS discovery. This step may involve the BS sending configuration information identifying a type of RS the BS will send that will be redirected by the RIS and scheduling information of when the BS will send the RS. Therefore, when the BS sends the RS the UE can identify that the RS was reflected by the RIS. Step 724 is another optional step that involves the BS sending the UE a list of RIS panels in the proximity of the UE so that the UE will know which RIS it may be receiving a reflected signal from. Step 726 involves the BS sending a RS, which the RIS redirects to the UE. Step 728 involves the UE measuring the RS. Step 730 involves the UE feeding back measurement information to the BS. Step 732 involves the BS initiating a channel measurement that may be used for channel estimation, as part of link setup. Examples of channel measurement methods will be described below.

Figure 7D:
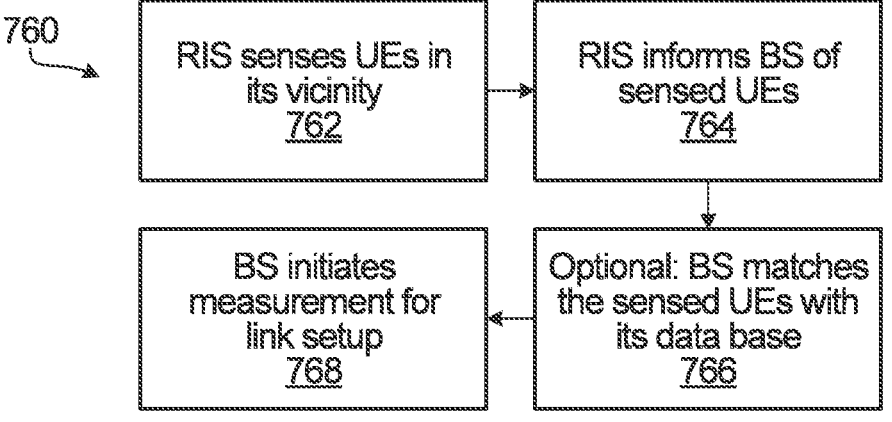

FIG. 7D is a flow chart that illustrates an example of steps that may be involved in RIS-UE link identification RIS 760 that involves RIS assisted UE discovery based on sensing. Step 762 involves the RIS sensing of any UEs in the vicinity of the RIS. This sensing can be RF based or non-RF based. RF based sensing may use in band measurement by one node (BS, UE or RIS) and detection with or without the involvement of the other node (BS, UE or RIS). Examples are when the sensing mechanism uses one node sending a sensing signal and the other node detecting the sensing signal, when a node sends the sensing signal and the same node or a different node measures a reflection of the sensing signal or when the node measures a reflection of the sensing signal sent from a non-cooperating node. Sensing may use other RF based mechanisms such as backscattering, Bluetooth or Wi-Fi. It may also use other sensors such as GPS, a camera, and Lidar. Step 764 involves the RIS informing the BS of the sensed UEs. Step 766 is an optional step that involves the BS matching the sensed UEs with a list of UEs stored in the BS. Step 768 involves the BS initiating a channel measurement that may be used for channel estimation, as part of link setup. Examples of channel measurement methods will be described below.

Figure 7E:
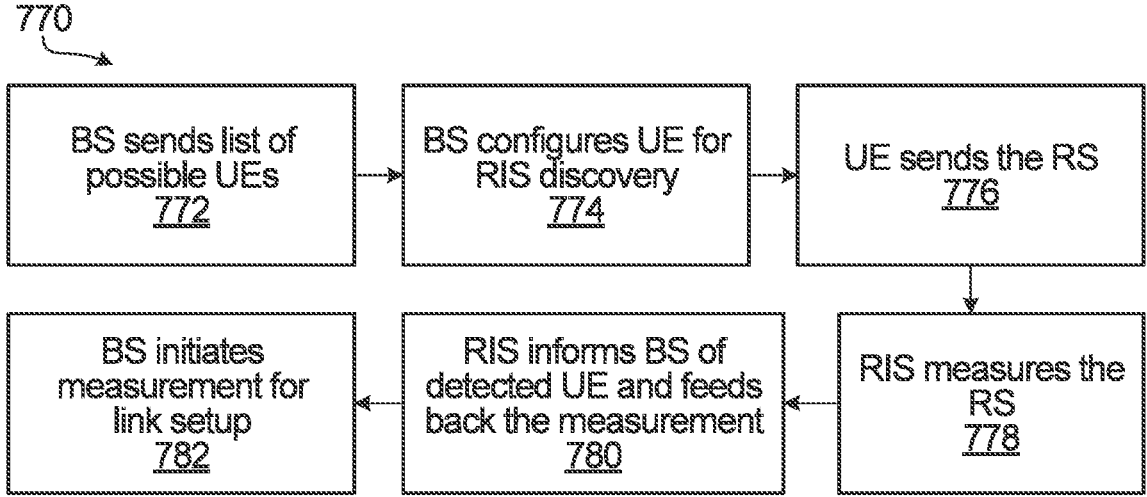

FIG. 7E is a flow chart that illustrates an example of steps that may be involved in RIS-UE link identification 770 that involves UE assisted RIS discovery. Step 772 involves the BS sending the RIS a list of UEs in the proximity of the RIS that are possible UEs with which the RIS could form a link. Step 774 involves the BS configuring the UE for RIS discovery. This step may involve the BS sending configuration information identifying a type of RS the UE should send that will be detected by the RIS and scheduling information of when the UE should send the RS. Therefore, when the UE sends the RS the RIS can identify which UE sent the RS. Step 776 involves the UE sending a RS. Step 778 involves the RIS measuring the RS sent by the UE. Step 780 involves the RIS informing the BS of detected UEs and feeding back the measurement based on the measured RS. Step 782 involves the BS initiating a measurement that may be used for channel estimation, as part of link setup. Examples of channel measurement methods will be described below.

Figure 7F:
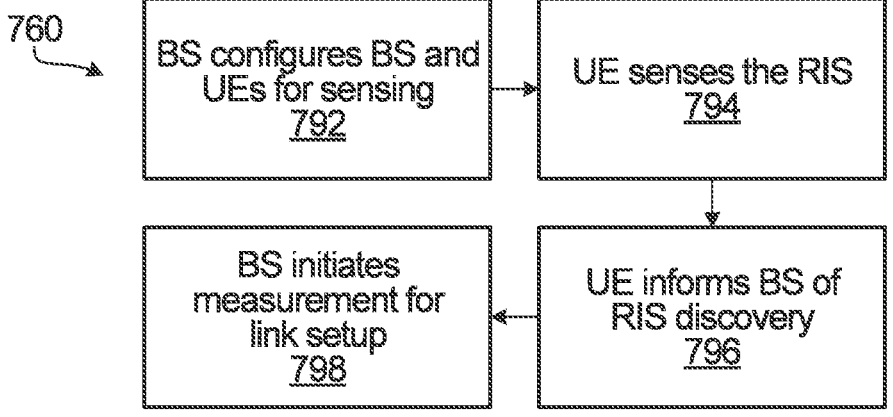

FIG. 7F is a flow chart that illustrates an example of steps that may be involved in RIS-UE link identification 790 that involves RIS assisted UE discovery based on sensing. Step 792 involves the BS configuring BS and the UE for sensing. This step may involve the BS sending configuration information identifying a type of sensing signal the UE should use to sense the RIS and scheduling information of when the UE should attempt to sense the RS. Step 794 involves the UE sensing the RIS. Step 796 involves the UE feeding back notification of the RIS detection by the UE based on the UE sensing. Step 798 involves the BS initiating a measurement that may be used for channel estimation, as part of link setup. Examples of channel measurement methods will be described below.

In a measurement-based approach for identification of RIS-UE link, the RIS may backscatter a signal transmitted by BS or the UE by including some modulation identification information to the signal.

Figure 7G:
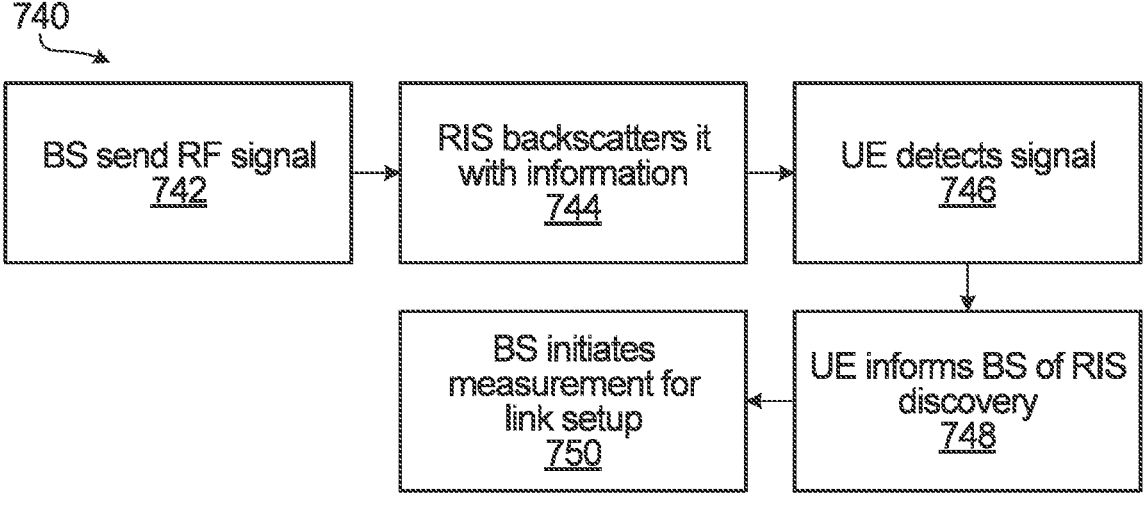

FIG. 7G is a flow chart that illustrates an example of steps that may be involved in RIS-UE link identification 740 that involves RIS backscattering. Before the BS sends an RF signal that will be backscattered or modulated by the RIS, the RIS needs to configure the elements of the RIS panel with an appropriate RIS pattern. There are several ways this can be achieved. In some embodiments, the BS sends configuration information to the RIS for configuring the RIS pattern. In some embodiments, the RIS pattern is selected by the RIS, for example from a list of possible patterns that may be specified by a communications standard. In some embodiments, the pattern is associated with at least one of a RIS manufacturer, a RIS serial ID, or a RIS model number. Step 742 involves the BS sending an RF signal. Step 744 involves the RIS backscattering the RF signal by modulating the RF signal with information as the RF signal is reflected by the RIS. Step 746 involves the UE detecting the RF signal. Step 748 involves the UE feeding back notification to the BS of RIS discovery by the UE based on the detected backscattered signal. Step 750 involves the BS initiating a measurement that may be used for channel estimation, as part of link setup. Examples of channel measurement methods will be described below.

Referring back to FIG. 5, within the scope of the link setup operation 520, there are two features shown. One feature of the link setup operation 520 pertains to BS-RIS link setup 522. Another operation of the link setup operation 520 pertains to RIS-UE link setup 524. Example methods related to the link setup 520 operation, as performed by the base station, by the RIS and by the UE, will be described in detail below.

After the RIS is deployed in the network, the RIS can set up the BS-RIS link and the RIS-UE link. Setting up the BS-RIS link involves the network configuring the RIS to establish a link capable of exchanging control information in order to enable the network to allow the BS to send signaling for configurating the RIS to interact with the UE, and optionally to exchange other information that may be relevant to setting up the UE-RIS link. For example, if the RIS is using the initial access mechanism to access the network, the BS may follow up with some signaling, possibly using RRC signaling, to setup the link. Alternatively, the BS may use backhaul Xn or Integrated Access Backhaul (IAB) signaling, or other mechanisms, to establish this BS-RIS link.

The link setup operation 520 in some embodiments comprises a BS-RIS link setup operation 522.

Unless the BS is pre-programmed with all the necessary mechanisms to work with the RIS using a channel and signaling mechanism that is vendor specific, the RIS and the BS need to setup the link between one another. In some embodiments, when the RIS is using the initial access mechanism to access the network, the RIS may follow up the initial access to the network with signaling to setup the link with the BS. In some embodiments, the signaling may use RRC signaling. In some embodiments, the RIS may use backhaul Xn or IAB signaling or other mechanisms to establish this link. Examples of methods for setting up the BS-RS link will be described below.

Several different types of configuration and control signaling messages that are used between the BS and the RIS are described below. In some embodiments, the signaling may be used for performing a capability information exchange. The RIS and BS may exchange information about at least one of the capabilities of the RIS (including the RIS reconfiguration speed), a required working bandwidth, location information pertaining to the RIS, data capacity and delay of the BS-RIS control link, and sensing capabilities. The data capacity and delay of BS-RIS control link may refer to the speed at which control information can be received and processed at the RIS and the overall delay for the transmission and processing those control messages, for example, if LF or HF or other links are used for the control information signaling between BS and RIS. Examples of capabilities of the RIS include, but are not limited to, frequency band, working bandwidth, phase control range, reconfiguration speed, size, linearity or reciprocity properties of the RIS.

Part of the BS-RIS set up involves the configuration of the RIS pattern used by the RIS to redirect a signal from either the BS or the UE. In some embodiments, control signaling includes a RIS pattern control mechanism. The BS and RIS agree on the RIS pattern control scheme. The RIS pattern is controlled under the direction of the network and is based on factors such as the underlying channel condition, the RIS-UE pairing, scheduling decision or serving BS, if more than one BS serves the UEs through the same RIS panel. The RIS pattern being controlled under the direction of the network means, for example, that the network provides configuration information for the RIS to generate the RIS pattern that is used to redirect a signal from the BS or from the UE to the UE or to the BS. The RIS may or may not have access to all the configuration information and as such different modes for controlling the RIS pattern may be used.

In some embodiments, the RIS pattern is fully controlled meaning that the RIS pattern is fully determined by the network. This may involve expressing RIS pattern information such as bias voltage for each element of the RIS panel or a phase shift (absolute or differential) for each element of the RIS panel to generate the RIS pattern. The RIS pattern information may be absolute RIS pattern information, e.g., the bias voltage or phase shift information for each configurable element of the RIS panel or be an alternative version of the information, maybe an index to a predefine RIS pattern known to the RIS that could be used to reduce overhead as compared to the absolute RIS pattern information. As the network is providing the RIS pattern information to the RIS, the RIS does not need to know any information about the channel, such as for example the CSI, and the UE that the BS is serving. The RIS receives the RIS pattern information, biases the configuration elements of the RIS panel based on the RIS pattern and any signal sent by the BS will be redirected by the RIS panel based on the configured RIS pattern. As the network is providing the RIS pattern information, the network controlled BS that is communicating with the RIS should be aware of detailed CSI (with the resolution up to element or element group) and also have knowledge of the control mechanism of the RIS panel. The detailed CSI can be determined by channel measurement that will be described in examples below as referenced in FIGS. 8A to 8C. Knowledge of the control mechanism of the RIS panel may be provided, for example, by the RIS as RIS capability information.

In some embodiments, the RIS pattern is partially controlled by the network. The BS provides the RIS configuration information that may include one or more of beam shape, beam direction and/or beam width of the impinging and/or reflecting beams at the RIS and the RIS can then determine a phase shift for each configurable element to achieve a desired RIS pattern. The direction may be expressed in absolute or relative terms with respect to other beam directions or previous RIS patterns, for example a few degrees of update in a particular direction. The RIS does not need to know CSI other than the particular beam direction signaled to it. The BS in such a case, does not need to know exactly how to implement the RIS pattern on the RIS panel. This mode allows a unified signaling between the BS and the RIS for different RIS panels. Also, this mode allows for self-calibration of the RIS without involving the BS.

In some embodiments, the RIS pattern is controlled by the RIS using RIS self-pattern optimization. This control mode is for RIS panels having a higher complexity, where the RIS has access to the CSI for both the BS-RIS link and the RIS-UE link (or alternatively the end to end BS-UE channel) and the RIS-UE link setup information. In some embodiments, the CSI knowledge may be acquired by the RIS itself through measurement or sensing, or both. In some embodiments, the CSI knowledge may be shared to the RIS by the UE, or the BS, or both. The active RIS-UE link is configured by the BS and the RIS optimizes the RIS pattern for serving the UE. For measurement purposes, the RIS may determine its own beam sweeping patterns as instructed by the BS.

In some embodiments, the RIS pattern is controlled using a hybrid mode. The RIS uses self-pattern optimization for the measurement functionality. However, for data communication, partial control is adopted where the RIS is instructed to use the RIS pattern with respect to the RIS patterns selected for measurement. As an example, the BS instructs the RIS to select N (an integer) different RIS patterns for N different instances of CSI-RS reflection. The RIS optimizes the N patterns in part based on the instructed number and/or based on the sensed information of the location of UEs or walls. Only the RIS needs to know the actual patterns. The RIS then uses the selected N different RIS patterns to redirect N copies of a CSI-RS from the BS on the BS-RIS link. The UE measures all or some of the CSI-RS that are redirected by the RIS in the direction of the UE and reports measurement results back to the BS. The BS then selects one of the RIS patterns and informs the RIS to use the selected pattern from the N measurement patterns, or a combination of several of the RIS patterns. In some embodiments, the RIS can perform initial beam forming or beam detection as an initial part of RIS-UE beamforming setup. Further beam turning can be performed by BS control. For example, the RIS may have some basic sensing capability and can determine beam directions for the UE that are close to the RIS. The RIS can share the determined beam direction information with the BS to help beamforming for further communication from the BS to the UE via reflection off the RIS.

After the BS-RIS link has been set up, a link may also be set up between the RIS and the UE. Setting up the RIS-UE link involves measurement of the link between the RIS and the UE, for example to perform channel estimation of the link.

The link setup operation 520 in some embodiments comprises a UE-RIS link setup operation 524.

In some embodiments, the RIS may be considered to be "invisible" to the UE, i.e. the UE does not necessarily know the RIS is in the link, so that the UE assumes the signal is received directly from the BS. In some embodiments, when the RIS is "invisible" to the UE, the UE-RIS link setup may involve channel measurement of the RS-UE link. In some embodiments, after the UE has determined a channel measurement, the UE sends feedback information regarding the channel measurement from the UE to the RIS, from the UE directly to the BS or from the UE to the BS via reflection off of the RIS. Since the RIS is invisible to the UE, the UE does not know which node receives its feedback and may use the beam direction as instructed by the BS or to the same direction it receives the measurement RS. Examples of channel measurement are described below with reference to FIG. 8A to 8C.

The UE-RIS link setup can be uplink based or downlink based depending on whether the UE sends the RS or the UE receives the RS. The setup can be independent of whichever device, the BS or the UE, is on the other end of the measurement link from the transmitting device. In downlink based measurement, the UE can feedback the measurement to the UE.

When the RIS is visible to the UE, i.e. the UE knows that the RIS is in the vicinity and reflecting a signal from the BS, the UE may receive information about the RIS from the BS. For example, the UE may receive information including the RIS ID, or where the RIS is located, so that the UE can determine a direction that it will receive a reflected signal from the RIS and an identification of a type of signal that the UE should expect to receive redirected from the RIS to properly identify the receive signal as being reflect by the RIS. Information about the location of the RIS may be absolute location information such as longitude/latitude/altitude/orientation or relative location information in respect to some other location that is known by the UE. In some embodiments, the RIS may use at least one of RIS specific SSB, RIS specific scrambling sequences for control channel, data channel or reference channel, RIS frequency band and bandwidth, and RIS specific reference signal structure (such as RIS specific patterns or RIS specific reference signal sequences). In some embodiments, the UE may optionally be able to make a direct link to the RIS using in-band or out-of-band communication. In some embodiments, the UE may use sidelink to communicate with RIS, or even use other RATs, such as Wi-Fi or BLUETOOTH.

In some embodiments, the RIS panel may be divided into sub-panels based on configuration information from the BS, where each sub-panel may serve a different UE or set of UEs. The sub-panels may be physically or logically differentiated. In some embodiments, the RIS may be comprised of multiple smaller panels that are each controllable separately. In some embodiments, the RIS comprises one panel and the BS instructs the RIS to apply independent patterns to different subsets of RIS elements. If the RIS pattern is fully controlled by the network, this phenomenon is transparent to the RIS. However, for partially controlled or autonomous RIS panels, the RIS is aware of the fact that different sub-panels use independent RIS patterns. Therefore, multiple RIS-UE links can be set up for a single RIS for which the RIS is divided into multiple sub-panels. In the following description, the RIS pattern for each sub-panel is referred to individually as the RIS may change the pattern of one sub-panel without changing the rest. In such a case, the RIS panel is effectively divided into multiple smaller co-planar panels.

The link setup involves having to perform channel measurement to establish the links. Referring back to FIG. 5, within the scope of the channel measurement and feedback operation 530, which comprises at least one of the five operations shown. A first feature pertains to setting up and triggering 532 of channel measurements. The second feature pertains to a channel measurement mechanism 534, for example on a per hop basis or on an end-to-end basis. The third feature pertains to reference signal transmission 536. The fourth feature pertains to a feedback mechanism 537. The fifth feature pertains to a sensing assisted operation 538. Example methods related to the channel measurement and feedback operation 530, as performed by the base station, by the RIS and by the UE, will be described in detail below.

In order to effectively perform communication between the UE and the BS via the RIS, the BS, the UE and/or the RIS, need knowledge of the channel, for example the CSI, to establish and maintain a link. In some embodiment, the BS, the UE and/or the RIS have access to partial CSI, for example the UE is only aware of a particular beam that should be used to best communicate with the BS. A measurement of a channel measurement RS, which is sent by either the BS or the UE, can be performed on a per hop basis or an end-to-end basis when determining the CSI. For end-to-end channel measurement, the BS sends the RS to the UE, or the UE sends the RS to the BS, and in each situation the RIS reflects the RS. In some embodiments, the RIS can measure the RS, as well as reflecting the RS to either the UE or BS.

The channel measurement and feedback operation 530 in some embodiments comprises a setup and trigger operation 532.

In some embodiments, sensing can be used to trigger a measurement. The RIS link may help the UE when there is an adequate quality channel between the RIS and the UE. This may assume that an adequate quality RIS link to the BS already exists. The measurement process may be suspended if an adequate quality channel is not expected. For example, RF sensing of certain sensing signals or synchronization signals may be used to trigger channel measurement and feedback for the RIS-UE link. Alternatively, non-RF based sensing using a camera or an infrared detector can be used to trigger the measurement. Alternatively, having access to the exact location and/or orientation of the UE and the RIS (based on GPS, a gyroscope, a compass and/or other RF-based, or non-RF based sensing), measurement may only be triggered if the UE is within a certain region and/or certain orientation range of the RIS.

The channel measurement and feedback operation 530 in some embodiments comprises a channel measurement mechanism 534.

In some embodiments, the RIS uses multiple different RIS patterns to enable channel measurement of a RIS-UE link. The use of multiple different RIS patterns allows multiple channel measurements to be made in different directions, at least one measurement based on each RIS pattern. For example, the RIS may not know exactly where the UE is located, so the RIS may have RIS patterns that can redirect a signal from the BS in several different directions in the area the UE is expected to be. By determining a channel measurement for each RIS pattern, a best RS measurement result at the UE, that is fed back to the BS, may indicate the proper direction of the UE and thus the proper RIS pattern to use for the RIS-UE link. In some embodiments, the measurement method involves beam sweeping. For a single RIS reflection between the BS and UE in which there are two hops, BS to RIS and RIS to UE, two beams and a reflection pattern are used to perform each channel measurement. A first beam is used at the BS, for either transmitting or receiving a RS, a second beam is used at the UE, for either receiving or transmitting a RS, and the RIS pattern used at the RIS which redirects the impinging beams. When the BS and the RIS are at fixed locations, the BS-RIS link is fixed and can be common for UEs in a certain proximity to the RIS. In such a scenario, beam sweeping can then be used between the UE and the RIS. Performing beam sweeping at the RIS for end-to-end transmission uses transmission of multiple RS from the transmitter (when either the BS or the UE is considered the transmitter depending on DL or UL transmission direction) to the RIS and reflection by the RIS in different directions using different RIS patterns. The receiver (again either the BS or the UE depending on DL or UL transmission direction) then measures the RS and finds a preferred beam-pattern pair between the UE and the RIS. The beam-pattern pair combined with a beam direction at the BS forms an information set that can be referred to as a beam-pattern triplet.

The channel measurement and feedback operation 530 in some embodiments comprises a reference signal transmission operation 536.

In some embodiments, when the RIS is capable of receiving or transmitting RS the channel can be measured on a per hop basis. As an example, to measure the channel between the UE and the RIS, the UE sends a reference signal, such as SRS, configured by the network, and the RIS receives and measures the RS. In such a scenario, the RIS may have receive elements that are part of the configurable elements of the RIS and can detect the RS sent by the UE. In some embodiments, the RIS is capable of synchronizing reception at the RIS with the UE transmission by receiving and detecting synchronization signals in terms of SSB or RS. The resulting measurement may be passed to the network to allow the BS to perform RIS pattern optimization, or be kept at the RIS so the RIS can perform RIS pattern optimization.

The channel measurement and feedback operation 530 in some embodiments comprises a feedback mechanism 537.

The process of measurement and feedback may rely on sensing data to determine when such information is worthwhile gathering. The sensing information may include localization of the UE such as information that indicates where the UE is located in relation to the RIS or the BS, or both.

Figure 8A:
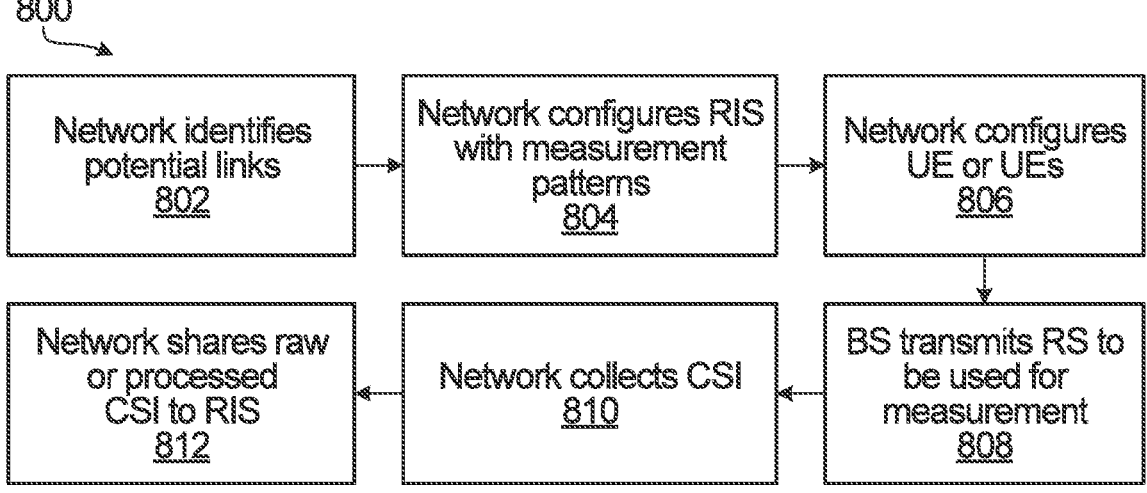
FIG. 8A to 8C are flow diagrams illustrating different example methods for implementing set up of RIS-UE links according to aspects of the application.
Figure 8B:
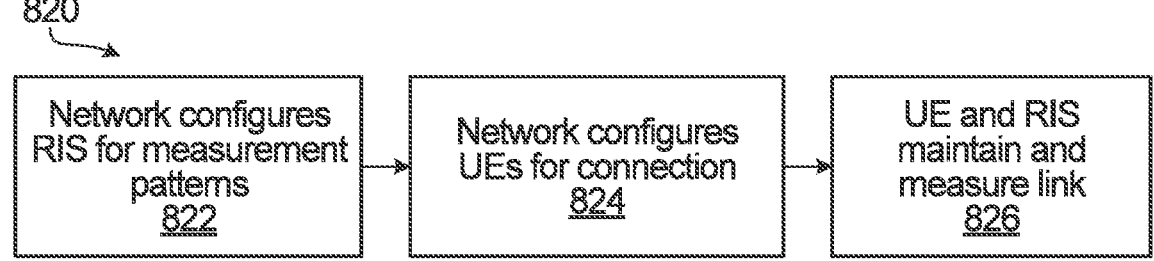
Figure 8C:
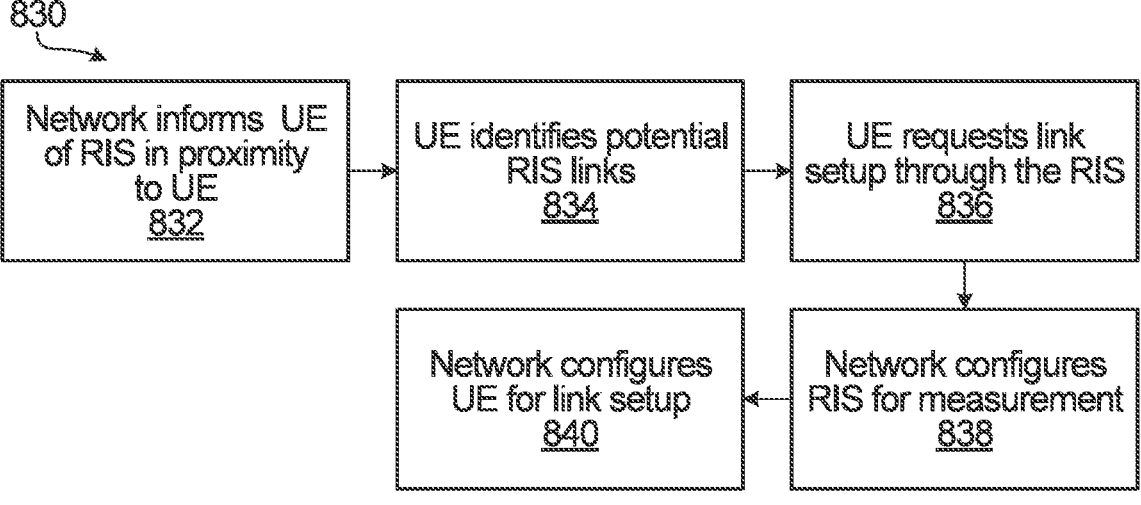

FIGS. 8A to 8C provide example flow charts for different methods that may be used for RIS-UE link setup described above.

FIG. 8A is a flow chart that illustrates an example of steps that may be involved in setting up a RIS-UE link 800 wherein the set up is controlled by the network. Step 802 involves the network identifying potential RIS-UE links. This may involve the BS referring to a list of RIS-UE links that were previously identified, for example as in the flow chart of FIG. 7A to 7G. Step 804 involves the network configuring the RIS with RIS patterns that the RIS can use as part of measuring the channel between the RIS and UE. Step 806 involves the network configuring one or more UEs with information relevant to channel measurement, such as the type of RS being used by the network for the measurement, time/frequency resources on which the RS may be transmitted, RS sequence and/or beam direction information. Step 808 involves a BS controlled by the network transmitting the RS that is to be reflected by the RIS and used for channel measurement. Step 810 involves the network collecting channel state information (CSI). In some embodiments, this may be CSI measurement information directly fed back by the UE, or reflected by the RIS, or fed back to the RIS from the UE and then the RIS feeds back the information to the network. Step 812 involves the network sharing CSI information with the RIS that can be used by the RIS for RIS pattern control, for example as described above being full control, partial control, or a hybrid.

In some embodiments, being controlled by the network means the cooperative RIS link is determined by network. This may involve the network notifying the RIS and one or more UEs about a possible connection via RRC, group cast or broadcast messaging. For example, in addition to a reference signal pattern, time-frequency resource allocation and reference signal sequences, the RRC can also indicate a carrier for measurement and possible beamformed RS signal directions, such as a range of AoA and or AoD. The one or more UEs and RIS can then use their link, under network instruction, to maintain and measure the channel. In some embodiments, the UE is aware of the RIS within the link. In some embodiments, the UE does not know the RIS is in the link and only sends/receives signaling towards a beam direction that has been configured by the network. In some embodiments, the network provides a UE specific beam direction to one or more of the UEs. In some embodiments, the network provides a group specific beam direction based on CSI-RS that e used by all the UEs that the group specific beam direction is provided to.

FIG. 8B is a flow chart that illustrates an example of steps that may be involved in setting up a RIS-UE link 820 wherein the set up is determined by the network. Step 822 involves the network configuring the RIS with RIS patterns that the RIS can use as part of measuring the channel between the RIS and UE. Step 824 involves the network configuring one or more UEs with information relevant to channel measurement, such as the type of RS being used by the network for the measurement, time/frequency resources on which the RS may be transmitted, RS sequence and/or beam direction information. Step 826 involves the UE and the RIS maintaining a link with the network and performing channel measurement of the link.

In some embodiments, while being controlled by the network, RIS control is assisted by UE. For example, the UE can send a request to the network for a link to be setup. When setting up a cooperative RIS link, signaling amongst the network, RIS, and UE may use one or more of RRC configuration, group signaling, or broadcast signaling. The network may then send a list of RIS panels in proximity to the UE. After the UE receives the list of RIS, the UE can identify potential RIS links for communication and sends a request for setting up a link between the UE and one or multiple RIS panels. In some embodiments, the UE request may be provided to the network through reflection by the RIS or sent by the UE to the RIS through a side link and the RIS then relays it to the network.

FIG. 8C is a flow chart that illustrates an example of steps that may be involved in setting up a RIS-UE link 830 wherein the set up is assisted by UE. Step 832 involves the network informing the UE of one or more RIS in proximity to the RIS. Step 834 involves the UE identifying potential RIS-UE links based on the information provided in step 832, i.e. if there is a RIS near the UE, a RIS-UE link may be possible. Step 836 involves the UE sending the BS a request for setting up a link via the R, either through RIS reflection or through digital relay by the RIS. The digital relay indicated here refers to low rate control signaling relayed by the RIS using a transceiver that is part of the RIS panel, as opposed to being reflected by configurable elements of the RIS. Step 838 involves the network configuring the RIS for channel measurement with RIS patterns that the RIS can use as part of measuring the channel between the RIS and UE. Step 840 involves the network configuring one or more UEs with information relevant to channel measurement, such as the type of RS being used by the network for the channel measurement and when the RS may be transmitted.

The channel measurement and feedback operation 530 in some embodiments comprises a sensing assistance operation 538.

In some embodiments, sensing can improve measurement performance and aid in reducing overhead. In some embodiments, the RIS-UE link has a strong line-of-sight (LOS) component, meaning that the RIS and the UE are substantially in view of each other without significant obstruction. With sensing, the beam direction may be available and have a desired accuracy, which eliminates a need for CSI measurement or can reduce overhead related to CSI measurement. For example, an infrared beam may be used to detect the RIS-UE link and set the beam direction. In some embodiments, sensing information such as orientation and location information of the UE and the RIS, or infrared detection information, a CSI-RS beam sweeping range may be reduced and more targeted toward the direction identified by a sensing mechanism when a more accurate beam direction is desired, as compared to the beam direction achieved by sensing without use of the CSI-RS, or if there is a calibration mismatch between the sensing information and beamforming capabilities of the RIS.

Referring back to FIG. 5, within the scope of the RIS control signaling operation 540, there are three features shown. The first feature pertains to RIS pattern control 542. The second feature pertains to RIS assisted measurement operation 544. The third feature pertains to RIS activation 546. Example methods related to the RIS control signaling operation 540, as performed by the base station, by the RIS and by the UE, will be described in detail below.

Embodiments of this disclosure propose reconfigurable and controllable RIS panels where the network is capable of configuring the RIS and hence effectively expanding network antennas in the form of the RIS panel. To enable configuring and controlling of the RIS panels control signaling is exchanged between the BS and the RIS. In some embodiments, the control mechanism and signaling utilize a vendor specific signaling method, i.e. control signaling that is not standardized or required to be used by more than the vendor or those using the vendor's equipment. In some embodiments, the control signaling utilizes a standardized mechanism to enable deployment of different types of RIS panels that have different levels of capabilities and designs, for example RISs with or without RF transceivers, RIS with or without other RAT radios, RIS that can generate their own RIS patterns and RIS that are manufactured from different types of materials.

The RIS control signaling operation 540 in some embodiments comprises a RIS pattern control and beamforming operation 542.

In some embodiments, RIS panels are capable of controlling their own RIS patterns and hence a resulting beam direction, shape and width of a wavefront that is reflected by the RIS. Signaling that may aid in configuring the RIS pattern, or generating the RIS pattern, or both, may use different levels of BS and RIS involvement, for example the BS may generate the RIS pattern and provide that RIS pattern to configure the elements of the RIS panel. In some embodiments, the BS may provide the RIS with channel measurement information and other information used to generate the RIS, and the RIS can generate the RIS pattern to be used by the RIS. In some embodiments, signaling mechanisms are agreed upon during the BS-RIS link setup. In some embodiments, the signaling mechanisms may be based upon how the RIS pattern is controlled. In some embodiments, how the RIS pattern is controlled may be dependent upon the RIS capabilities and can therefore be determined, at least in part, on the RIS reporting the RIS capability to the BS. In some embodiments, the signaling mechanisms are used to determine the UE, BS and RIS behaviors during UE-RIS link discovery, measurement and data reflection periods or control reflection periods, or both.

The RIS control signaling operation 540 in some embodiments comprises a RIS assisted measurement and feedback operation 544.

Depending on whether the channel measurement is performed end-to-end or on a per hop basis, the involvement of the RIS, and as a result the control signaling, may be different.

In some embodiments, the RIS performs end-to-end channel measurements. The RIS may have a list of stored RIS patterns that can be used for redirecting a signal impinging on the RIS when performing channel measurement. The list of patterns may be added to the RIS at the time of manufacture, when being deployed in the network, or provided by the network during initial access or periodically updated. Each RIS pattern may be associated with a different reflection pattern and is used at the same time that the corresponding RS is transmitted by a BS or a UE. In some embodiments, the BS may provide the RIS an identification of particular RIS patterns that the RIS stored in memory and the timing associated with performing the measurement. The timing associated with performing the measurement may include scheduling information of when the BS will transmit a RS that the RIS needs to redirect to the UE. In some embodiments, the BS may provide the RIS with RIS patterns that the RIS should configure the elements of the RIS panel and the timing associated with performing the measurement.

In some embodiments, the RIS performs per-hop channel measurements, i.e. RIS-UE channel measurements or BS-RIS channel measurement, when the RIS is configured with the capability to be able to measure a reference signal transmitted by the BS or UE at the RIS. The RIS is notified of channel measurement timing and the sequence of the RS sent towards the RIS. The measurement process may involve beam sweeping at the transmitter side, which means the RIS will measure different instances of RS of the UE transmitting on different beams. Beam sweeping may involve the RIS using different beams to receive the different instances of the RS sent in the RIS direction, i.e. sweeping beams across the range of directions. In some embodiments, the RIS reports results of the channel measurement made by the RIS back to the network, or to the UE, or both. The results of the channel measurement may be used by the UE and BS for determining beam forming information to be used at those devices. The results of the channel measurement may be used for generating RIS patterns to provide a best signal to the UE or BS when redirected by the RIS.

In some embodiments, the RIS performs RIS pilot transmission, which includes the RIS having a transmission capability to be able to transmit a RS, for use in the channel measurement process. The RIS knows the timing and sequence of the RS that the RIS will be transmitting. In some embodiments, the RIS may use beam sweeping when transmitting the RS to provide multiple RS in the direction of the UE. In some embodiments, at the receiving side, the BS or the UE may use beam sweeping to detect the RS signal transmitted by the RIS.

The RIS control signaling operation 540 in some embodiments comprises a RIS activation operation 546.

Once the BS-RIS links and the RIS-UE links are step up, the RIS can be used in the BS-UE link to redirect transmission of signals from the BS to the UE or from the UE to the BS. In order to redirect signaling, the RIS is configured with at least scheduling information pertaining to when a signal from a transmitter is being sent to the receiver and which receiver the signal is being sent to, so that the RIS knows which RIS pattern to use to redirect the signal in the correct direction. The RIS, the BS-RIS link and the UE-RIS link may each be activated or deactivated based on instructions from the network. Such instructions may take the form of higher layer signaling or messaging such as DCI or UCI or media access control (MAC control element (CE). Activating and deactivating the RIS can be used for power saving and reduction of signaling overhead.

The activation and deactivation of the RIS, the BS-RIS link and the UE-RIS link can be performed on a dynamic basis, which may be considered a short-term basis. Performing activation or deactivation on a dynamic basis refers to activation or deactivation on a scheduling time interval and is based on short term channel and traffic conditions. As a part of RIS-UE link set-up the potential RIS-UE links are identified. The BS can further determine which RIS-UE links need further channel acquisition, sounding and measurements. This determination may minimize unnecessary measurement efforts for RIS and UE. This can be done based on UE specific RIS selection.

The activation and deactivation of the RIS, the BS-RIS link and the UE-RIS link can be performed on a semi-static basis, which may be considered a long-term basis that is of the duration of multiple TTIs (much slower than scheduling decision frequency determined by TTI) and the activation/deactivation decision is made based on the statistical properties of the wireless channel, UE distribution and/or traffic. When activating or deactivating the RIS or RIS-UE link on a semi-static basis, this may be considered a long-term activation or long-term deactivation. When activating or deactivating the RIS or RIS-UE link on a dynamic basis, this may be considered a short-term activation or short-term deactivation.

In some embodiments, decisions regarding when to activate or deactivate a link may depend on factors such as, but not limited to, current channel quality, UE distribution, data traffic, UE data and delay requirements, interference experienced on the link or scheduling decisions.

From the UE perspective, signaling to activate or deactivate a link may involve using a higher layer signaling to activate one or more RIS-UE links. While there might be multiple active links to different RIS panels, an actual reflecting RIS link may be dynamically selected among activated links. Part of the activation mechanism involves performing channel measurement of the RIS-UE link. CSI-RS for only active links is measured and fed back to the BS.

In some embodiments, the BS and the RIS are aware of the existence of the RIS-UE link and the RIS pattern for reflection of the beam to and from the UE. Therefore, the result of performing RIS-UE link setup may be for the RIS being provided a proper RIS pattern for reflection from the BS or generating a proper RIS pattern for reflection based on information provided by the BS. From the UE perspective, configuring the UE to receive a signal that has been reflected by the RIS may be performed with the same mechanism that is used for setting up the direct link between the UE the BS.

Figure 9A:
FIG. 9A to 9C are flow diagrams illustrating different example methods for activating RIS-UE links according to aspects of the application.

FIG. 9A is a flow chart that illustrates an example of steps that may be involved in setting up and activating a RIS-UE link 900. Step 902 involves establishing one or more RIS-UE links. This may be performed by methods such as those described in FIGS. 7A to 7F. Step 904 involves the BS sending a message to activate a subset of existing RIS-UE links associated with the RIS. Step 906 involves the UE performing CSI measurement for the activated RIS-UE link determining the CSI may be performed for either DL (i.e. using CSI-RS transmitted from the BS) or UL (i.e. using SRS transmitted from the UE) scenarios. This may be performed by methods such as those described in FIGS. 8A to 8C.

The RIS can be a fast RIS or a slow RIS, in terms of how fast the RIS pattern can be updated. Slow RIS panels cannot easily change the RIS pattern in a dynamic manner, i.e. updating the RIS pattern in a fast enough manner compared to the transmission time intervals, and therefore are better for use for a long-term link activation or deactivation. A long-term link is a link that may be maintained for multiple scheduling durations. The slow RIS panels enable a UE-RIS link to only one UE or one group of UEs that have similar beam patterns, i.e. they are generally along a same beam path. In some embodiments, the BS notifies the RIS regarding the active UE-RIS link. In some embodiments, the BS configures the RIS with a RIS pattern to reflect a signal in the direction of the target UE. Fast RIS panels can change the RIS pattern in a dynamic manner, i.e. updating the RIS pattern fast enough to allow the pattern to effectively be received by the desired receiver, and therefore the RIS panels can support multiple active links with UEs that are not collocated or along the same directional path. The RIS may retain CSI and/or RIS patterns for multiple active links. The RIS patterns can then be dynamically changed to reflect a desire signal in the direction of the scheduled UE as instructed by the BS based on its scheduling decision.

Figure 9B:
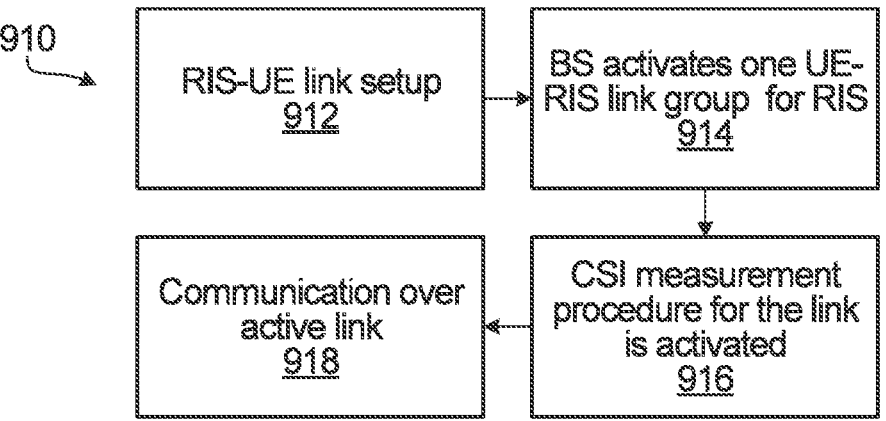

FIG. 9B is a flow chart that illustrates an example of steps that may be involved in setting up and activating a RIS-UE link 910. Step 912 involves setting up a RIS-UE link. This may be performed by methods such as those described in FIGS. 7A to 7G. Step 914 involves the BS sending a message to activate one RIS-UE link associated with the RIS. Step 916 involves performing CSI measurement for the activated RIS-UE link. This may be performed by methods such as those described in FIGS. 8A to 8C. Step 918 involves communications occurring over the BS-RIS and RIS-UE links at a scheduled time.

Figure 9C:
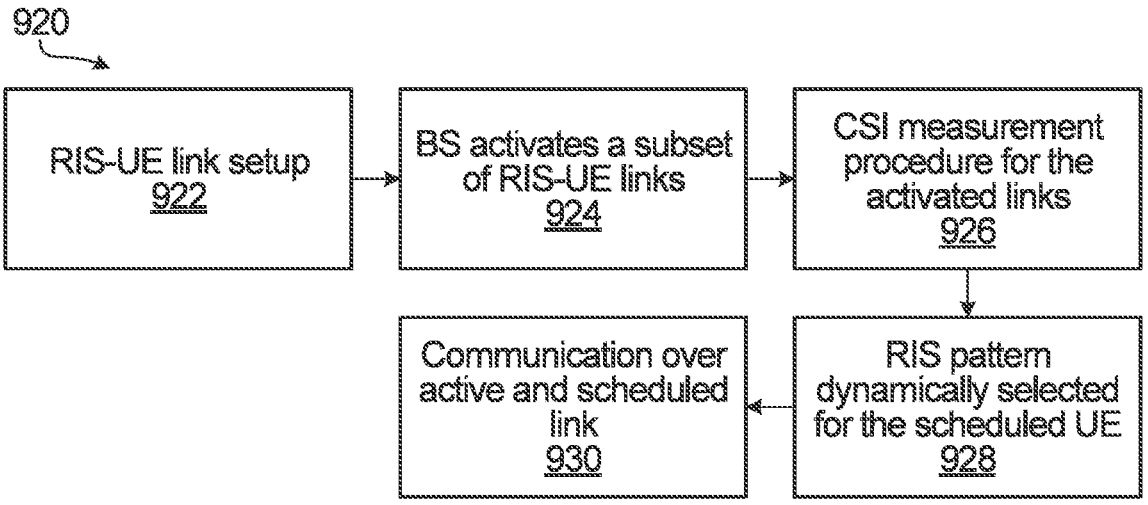

FIG. 9C is a flow chart that illustrates an example of steps that may be involved in setting up and activating a RIS-UE link 920. When the RIS has multiple RIS-UE links that are activated, the RIS can dynamically change the RIS pattern to redirect signaling from a first UE to a second UE based upon receiving the appropriate control signaling from the BS. Step 922 involves setting up a RIS-UE link. This may be performed by methods such as described in FIGS. 7A to 7G. Step 924 involves the BS sending a message to the RIS and/or to the impacted UEs to activate a subset of existing RIS-UE links associated with the RIS. Step 926 involves performing CSI measurement for the activated subset of RIS-UE links. This may be performed by methods such as those described in FIGS. 8A to 8C. Step 928 involves the appropriate RIS pattern being dynamically selected for a scheduled UE. The RIS pattern may be selected by the RIS or the BS. Step 930 involves signaling occurring over the BS-RIS and RIS-UE links at the appropriate time for the schedule UE. At a subsequently scheduled time, the RIS pattern can be dynamically selected for a different schedule UE.

In some embodiments, when there are no active RIS-UE links for a particular RIS, the RIS may be deactivated to save power at the RIS or to avoid undue interference with other signaling. In some embodiments, deactivation of the RIS results in deactivation of the BS-RIS link as well.

Depending on the mechanism and reconfiguration speed used by the RIS panels to perform beamforming and measurement, the RIS may be synchronized with the network at different levels of precision. Synchronization for RS reception by the RS, which is used for example when performing channel measurement, may need more accurate timing as compared to long term beamforming, which is used for example when the RIS is configured for data reflection. Therefore, RIS panels that can be updated fast (for example, meaning the RIS panels are able to reconfigure the RIS pattern at a fraction of a scheduling internal and/or a transmission time interval (TTI)) and that can be accurately synchronized are capable of beam switching and activation at an appropriate scheduling level and for measurement. RIS panels that can be updated more slowly (for example, meaning the RIS panels are not able to reconfigure RIS patterns on the order of a scheduling time interval), but that can be accurately synchronized, are capable of measurement and long term beam switching and activation. RIS panels that cannot be accurately synchronized are generally capable of long term beam switching and activation.

In some embodiments, the RIS may use an internal transceiver or a global positioning signal (GPS) for over-the-air synchronization. In some embodiments, the RIS may use a clock signal at the backhaul link for maintaining synchronization with the network.

Referring back to FIG. 5, within the scope of the communication operation 550, there are three features shown. The first feature pertains to physical layer control signaling 552. The second feature pertains to data communications 554. The third feature pertains to dual connectivity 556. Example methods related to the communication operation 550, as performed by the base station, by the RIS and by the UE, will be described in detail below.

A goal of utilizing RIS is to improve communication throughput and reliability in the network by enhancing the signal-to-interference+noise-ratio (SINR) of the wireless channel, increasing the channel rank or channel diversity, or combinations thereof. The RIS may be utilized to reflect the data signal only or may be utilized to reflect both control and data.

The communication operation 550 in some embodiments comprises a physical layer control mechanism 552.

Once the BS-RIS links and the RIS-UE links are step up and the RIS is to be used in the BS-UE link to redirect transmission of signals from the BS to the UE or from the UE to the BS, the UE also needs to be configured for either transmitting to the BS or receiving from the BS. In some embodiments, scheduling information is determined by the BS, for example, by a scheduler in the BS or associated with the BS.

In some embodiments, the scheduling information for the UE is sent by the BS and reflected by the RIS to the UE. In some embodiments, the RIS is used to reflect downlink control signaling from one or more BS to a single UE or to multiple UEs. In some embodiments, the RIS is used to reflect the uplink control signaling from a single UE or from multiple UEs to one or more BS. For RIS panels that are capable of updating their RIS patterns more slowly than a scheduling time interval and TTI, the RIS may only serve UEs within the same general beam direction with data and control signaling. RIS panels that are capable of updating their RIS patterns more frequently, as compared to the TTI, can be used to serve multiple UEs that are located in different directions from one another. In some embodiments, physical layer control signaling and direct link signaling for control signaling is used between the BS and UEs.

In some embodiments, the scheduling information is sent directly by the BS to the UE through other channels, for example at low frequency (LF), an example of which is a microwave band below 6 GHz.

In some embodiments, the scheduling information can be sent to the RIS, which detects the scheduling formation and then the RIS and communicates with the UE by a RIS-UE sidelink. In some embodiments, the RIS may arrange a sidelink communication channel with the UE. The RIS may include a transceiver that allows the RIS to use in-band or out-of-band signaling or using other types of radio access technology (RAT), such as Wi-Fi or Bluetooth.

The communication operation 550 in some embodiments comprises a data communication operation 554.

Once the RIS and UE are configured for signaling that uses the RIS to redirect a signal, the link is ready for data signaling to occur on the BS to UE link via the activated RIS panel. In some embodiments, the RIS when properly configured and when capable of support appropriate timing accuracy can reflect the data between the BS and the UE. This is performed by the RIS using a proper RIS pattern and proper beamforming at the TRP or the UE, or both.

In some embodiments, the data may be accompanied by a demodulating RS, such as, for example, a demodulating reference signal (DMRS).

The communication operation 550 in some embodiments comprises a dual connectivity operation 556.

In some embodiments, the UE is connected to the BS through multiple links, for example a direct link between the BS and UE or a secondary link reflected by at least one other RIS, or both.

When more than two links are used, synchronization between the signaling on the two or more links can become an important issue. For example, in a DL scenario, the UE can perceive multiple links using different beam direction and timing within a difference of the propagation time of two or more signals. In some embodiments, the propagation time difference can be compensated by the BS. For example, the BS may delay a direct link transmission to arrive at a time close to when a reflect link transmission may arrive at the UE.

A multi-link communication mechanism may include a diversity mechanism such as dynamic beam switching. A diversity scheme is a mechanism to improve the reliability of the communication message whereby more than one communication channels are used. In wireless systems, these channels can be separated by the physical or logical transmit ports (transmit diversity), multiple receiver antennas (receive diversity), or different frequencies. A beam switching diversity may be similar to a dynamic point switching (DPS) transmit diversity scheme.

When there is joint reflection transmission in any of DL, UL and SL, the transmissions may be coherent or non-coherent. When the transmissions are coherent, two or more RISs can reflect signals to positively reinforce one another and to increase SINR. When the transmissions are non-coherent, two or more RISs provide simultaneous links between transmitter and receiver.

In some embodiments, UE behavior may include maintaining beams to multiple RISs and the UE may transmit to, or receive from, or both, the active subset of RISs.

Figure 10:
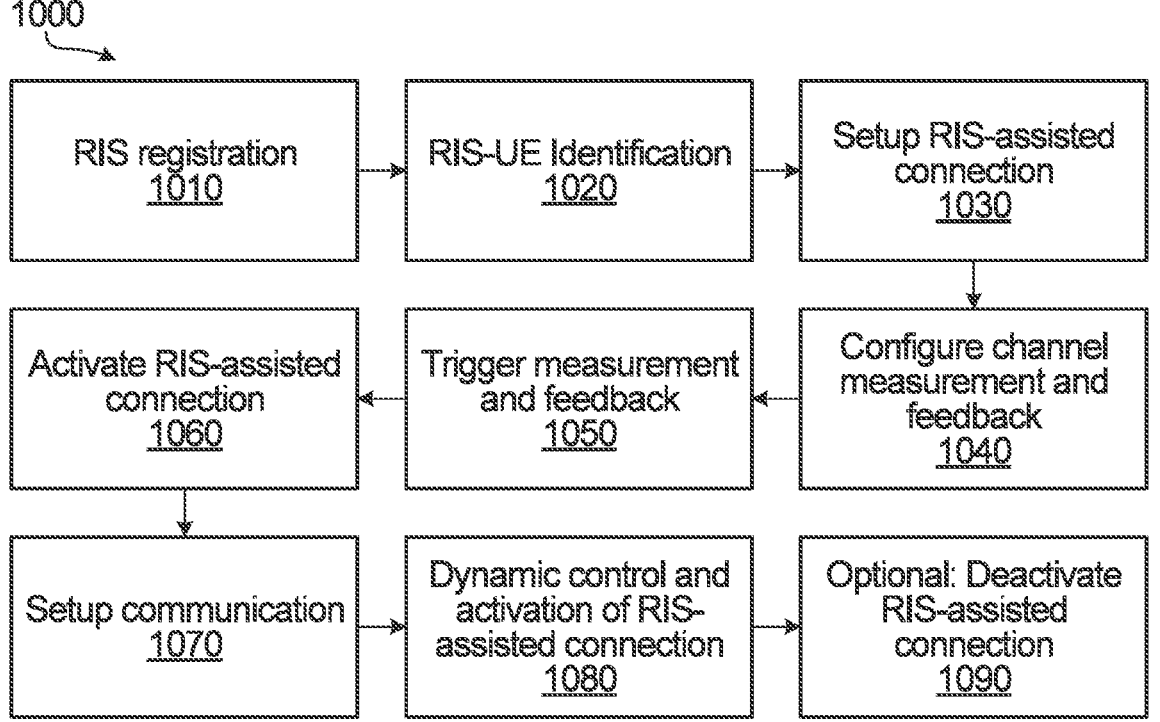
FIG. 10 is a flow diagram illustrating steps that may be involved in implementing aspects of the framework according to an aspect of the application.

FIG. 10 is a flow diagram 1000 that shows a high level example of many of the features included in FIG. 5 as steps involved in discovering the RIS, setting up and activating RIS-UE links, and using the RIS to reflect a signal in a network environment between a transmitter and a receiver, wherein the transmitter can be the BS and the receiver can be the UE for DL or the transmitter can be the UE and the receiver can be the BS for UL. At 1010, registration of the RIS takes place in the network. This step corresponds to RIS registration in the network 512 in the identification operation 510 in FIG. 5.

At 1020, a RIS-UE link is discovered. This step corresponds to RIS-UE identification 514 in the identification operation 510 in FIG. 5. In some embodiments, the RIS visibility by the UE 516 can affect how the RIS-UE identification 514 is performed. In some embodiments, the RIS-UE link is discovered by the BS sending a reference signal (RS), such as a channel state information reference signal (CSI-RS), that is associated with the RIS and which is reflected by the RIS and detected by the UE. Since the CSI-RS is associated with the RIS, when the CSI-RS is detected at the UE, the UE knows that the CSI-RS was redirected by the RIS. In some embodiments, the RS sent by the BS may be passively modulated by the RIS, also referred to as backscattering before being detected by the UE. In some embodiments, a reference signal, for example SRS, sent by the UE is detected by the RIS to aid in discovery between the RIS and UE. In some embodiments, the RIS and the UE communicate through a channel such as an in-band channel, an out of band channel, other RATs, or a sidelink channel. In some embodiments, determining the RIS-UE link may be sensing assisted, i.e. helped by knowing the UE position determined by sensing.

At 1030, the RIS assisted connection is setup between the transmitter and receiver. This step corresponds to the link setup operation 520 in FIG. 5, including methods that may be performed for the BS-RIS link setup 522 and RIS-UE link setup 524, some examples of which were described with reference to FIGS. 7A to 7G.

At 1040, a channel measurement mechanism to determine channel measurement on the RIS assisted connection, and a feedback mechanism as needed, is configured. At 1050, the measurement and feedback mechanisms are triggered. The triggering may be based on sensing or based on measurement of some discovery signals such as synchronization signal. The trigger may be detected by the BS or the RIS, and/or the UE. When the UE or RIS detect the trigger, they may inform the BS to resume measurement and feedback. Similarly, a trigger may be used to suspend the measurement and feedback. After the measurement is triggered and resumed, the measurement can be UL based or DL based. For a DL based measurement, a reference signal, such as CSI-RS, is reflected by the RIS and measured by UE. For a UL based measurement, a reference signal, such as SRS, is reflected by the RIS and measured by the BS. In some embodiments, the RIS can perform a measurement, which may include measuring the CSI-RS from the BS or the SRS from the UE, or both. The measurement mechanism setup 1040 and the triggering of the measurement mechanism 1050 for determining channel measurement correspond to methods that may be a part of the channel measurement and feedback operation 530, some examples of which were described with reference to FIGS. 8A to 8C.

At 1060, the RIS assisted connection is activated for use. Higher layer signaling including configuration information may be transmitted to the UE and control signaling including configuration information to the RIS for determining RIS patterns and for activating the RIS. The activation of the RIS assisted connection 1060 corresponds to methods that may be a part of the RIS activation 546, some examples of which were described with reference to FIGS. 9A to 9C.

At 1070, data communication is configured and implemented using the RIS assisted connection. In some embodiments for a DL data communication or a UL data communication, physical layer signaling used to configure the UE for signaling between the transmitter and receiver may be reflected by RIS. In some embodiments, physical layer signaling is sent by the BS to the UE over an auxiliary link, such as direct link or LF (an example of which is a microwave band below 6 GHZ). In some embodiments, physical layer signaling is sent by the RIS to the UE through auxiliary link, such as Bluetooth, or a sidelink control mechanism. In a DL scenario, after the UE is configured to receive the data signaling, the data is sent by BS at the scheduled time and reflected by the RIS to the UE. In an UL scenario, after the UE is configured to transmit the data signaling, the data is sent by UE at the scheduled time and reflected by the RIS to the BS. It should also be known that in some embodiments, multiple RIS can each be in communication with one or more UEs.

At 1080, on a continuous basis, or as necessary, dynamic control and activation/deactivation of the RIS assisted connection occurs. Dynamic control and activation/deactivation may be used, for example, when signaling is changed from a first UE to a second UE and so the RIS pattern needs to be changes, or if the link is not being used, the RIS or an RIS-UE link may be deactivated to save power or avoid interference. At step 1090, as necessary the RIS-assisted connection can be deactivated when not needed by the BS signaling a RIS deactivation message or a RIS-UE link deactivation message for a particular RIS-UE link to the RIS.

Figure 11:
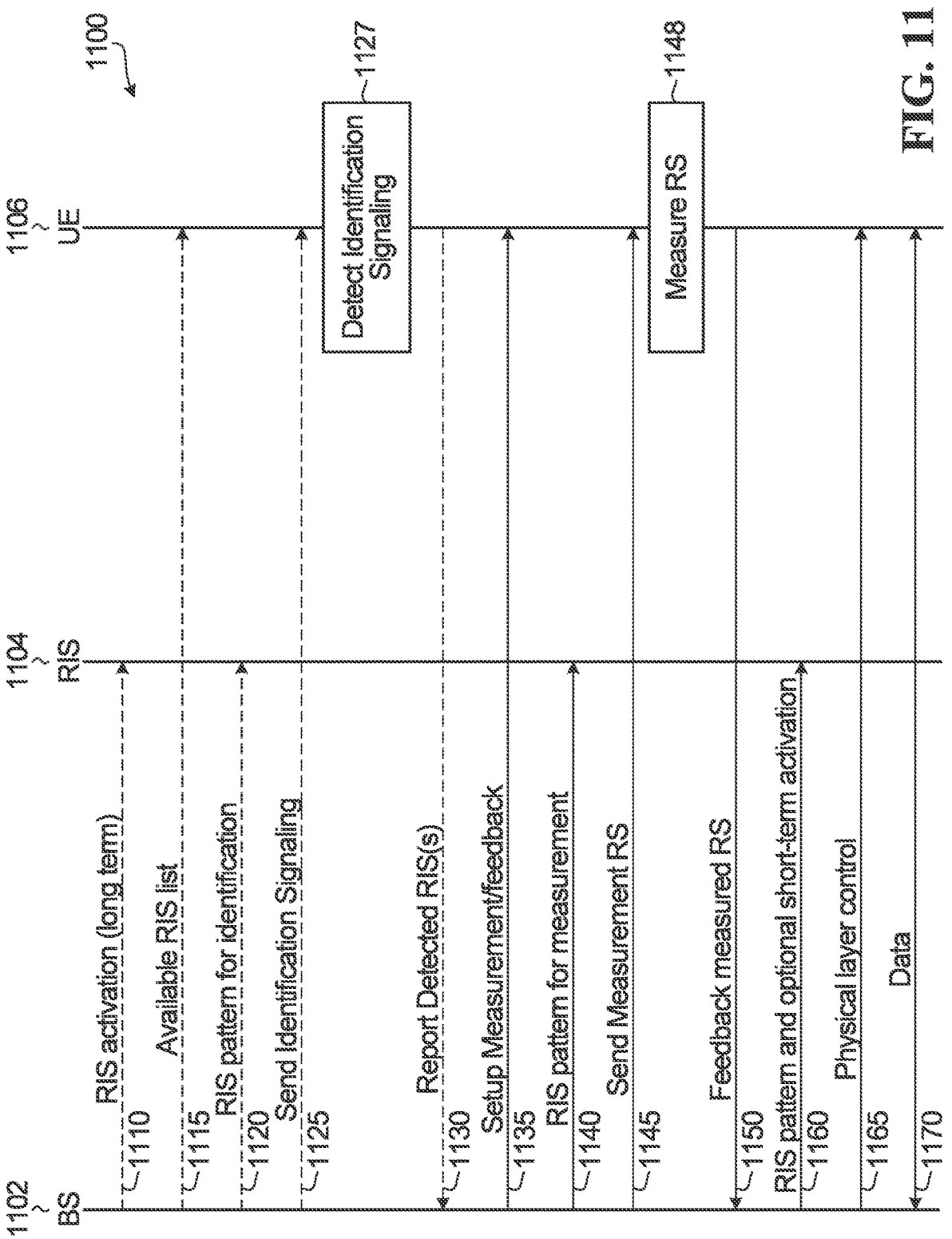
FIG. 11 is a signal flow diagram illustrating signaling between a BS, an RIS and a UE for RIS and UE configuration and data transmission between the BS and UE according to an aspect of the application.
Figure 12:
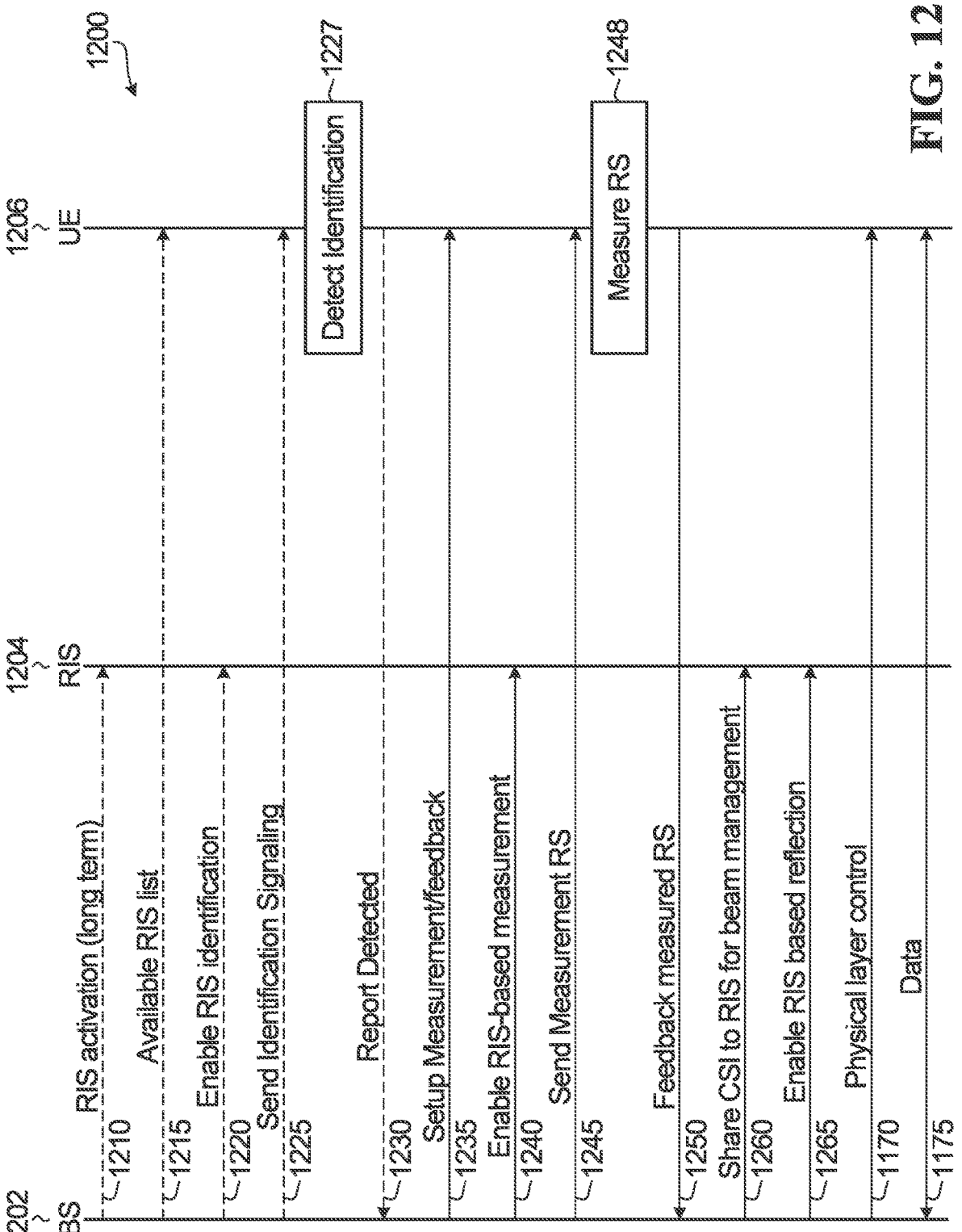
FIG. 12 is a signal flow diagram illustrating signaling between a BS, an RIS and a UE for RIS and UE configuration and data transmission between the BS and UE according to another aspect of the application.

FIGS. 11 and 12 are two examples that describe further details of how the blocks of flow diagram 560 may be implemented in terms of signaling between the BS, the RIS and the UE.

FIG. 11 is a signal flow diagram 1100 that shows an example signaling diagram for signaling between a BS 1102, a UE 1106 and a RIS 1104, where the RIS 1104 is controlled by the BS 1102. The signal flow diagram 1100 incorporates many of the above discussed framework operations. The signal flow diagram 1100 shows signaling that occurs subsequent to a BS-RIS link being established, which may, for example, occur in RIS registration 1110 in FIG. 10.

Signaling lines 1110, 1120, 1140 and 1140 indicate signaling commands from the BS 1102 to the RIS 1104. These commands can be transmitted over the air or through a wired connection. If they occur over the air then the RIS 1104 is assumed to have a transceiver or sensor for receiving from the BS 1102 and reflecting on the configurable elements for transmitting to the BS 1102. In some embodiments, the commands may use a standardized mechanism designed for RIS control. In some embodiments, the commands may use new or existing mechanisms such as RRC or Xn.

Signaling lines 1125, 1145, 1165 and 1170 show the signals that are reflected by the RIS 1104 from the BS 1102 to the UE 1106 or from the UE 1106 to the BS 1102.

Signaling lines 1115 and 1135 show RRC messaging from the BS 1102 to the UE 1106 to provide the UE 1106 with configuration information. This may be a direct link between the devices, as shown in FIG. 11, or reflected by the RIS 1104, which is not shown in FIG. 11. In some embodiments, the RRC messaging uses the same path as data communication configuration for a duration of time that the data communication is performed. In some embodiments, the RRC messaging uses a separate link in the same frequency band. In some embodiments, the RRC messaging uses a separate link in a different frequency band.

Signaling lines 1130 and 1150 show uplink physical layer control signaling which is not reflected by the RIS 1104. However, in some embodiments, the uplink physical layer control signaling could be reflected by the RIS 1104.

Signaling 1110, 1115, 1120, 1125 and 1130 in combination are an optional operation that corresponds to RIS-UE link identification 1120 and setting up the RIS-assisted connection 1030 in FIG. 10. The BS 1102 sends an activation message 1110 to the RIS 1104 so that the RIS 1104 knows it may be used. The BS 1102 also sends a message 1115 to the UE 1106 so that the UE 1106 is made aware that the RIS 1104, and any other RIS panels in the proximity of the UE 1106, may be used to reflect signals to the UE 1106. The message 1115 may be explicit or implicit. An explicit message may include the actual RIS IDs and the signaling on how to detect the RIS panels associated with message 1125. It may also be implicit only indicating the detection mechanism to be used for RIS detection in 1125 without the UE aware of its association to any particular RIS panel. The message 1115 may include the identification signaling attributes. For example for CSI-RS based detection it may include time/frequency resources, pattern, beam direction, sequence, and/or associated SSB. The message 1115 may be reflected by the RIS 1104 or may be sent directly to the UE

1106. Message 1115 may only be sent to the UE 1106 if the UE 1106 is going to be made aware of the RIS 1104.

Signaling 1120 and 1125 are used by the BS 1102 to further aid the UE in identifying 1227 the RIS 1104. Message 1125 may include some RS as instructed in message 1115. Message 1120 is sent by the BS 1102 to the RIS 1104 that provides pattern information to the RIS 1104 to be able to reflect to the UE 1106. This may be information specific to the RIS 1104 to set the pattern without having to generate the pattern or it may be general information that identifies location information for the UE 1106 to allow the RIS 1104 to generate the RIS pattern itself. Message 1125 is sent by the BS 1102 to the UE 1106, which is reflected by the RIS 1104 that is using a RIS pattern based on the pattern information provided by the BS in message 1120. Message 1130 is a report from the UE 1106 for the BS 1102 to acknowledge that the UE 1106 had detected the RIS 1104. The UE may report raw or processed measurement information on the detected RIS panels. For implicit RIS identification, the UE may not know which RIS panel is associated to the detected identifying signal 1125. While only a single RIS 1104 is shown, it is to be understood that there could be multiple RIS being discovered by the UE 1106 and reported back to the BS 1102.

In some embodiments, the RIS can detect the UEs and can establish a link to the UEs. In some embodiments, the RIS can detect the UE as a result of the report 1130. In some embodiments, the RIS can detect the UE as a result of detecting other UE signals such as the physical random access channel (PRACH) or UL data or control signaling. In some embodiments, the RIS can detect the UE using a sensing mechanism.

Signaling 1135, 1140, 1145 and 1150 in combination are an operation that corresponds to measurement and feedback setup 1040 and triggering measurement and feedback 1050 in FIG. 10. Message 1135 is sent by the BS 1102 to the UE 1106 that provides measurement and feedback configuration information to be used by the UE 1106. This may be information that enables the UE to know what type of RS may be received, the RS sequence, RS time/frequency patterns, RS timing and corresponding port and beam direction, such as quasi-colocation (QCL) information. Message 1140 is sent by the BS 1102 to the RIS 1104 that includes configuration information regarding one or more RIS patterns to be used by the RIS to reflect reference signals. This information is specific to the RIS to set the pattern without the RIS 1104 having to generate the pattern. Message 1145 includes reference signals sent by the BS 1102 in accordance with the instructions in message 1135, that are subsequently reflected by the RIS 1104 and received by the UE 1106. The reference signals may be channel state information reference signals (CSI-RS). The UE 1106 can use the reference signal information to estimate the channel and determine CSI 1148. Message 1150 is a report sent from the UE 1106 to report measurement results, that for example, may include CSI, to the BS 1102.

In some embodiments, the measurement may be performed by the RIS 1104 as explained above. In such a case, the CSI is available at the RIS 1104 and the RIS 1104 can forward the measured CSI to the BS 1102.

Signaling 1160, 1165 and 1170 in combination are an operation that corresponds to activate the RIS-assisted connection 1060 and set up of communication 1070 in FIG. 10. Message 1160 is sent by the BS 1102 to the RIS 1104 that provides pattern information to the RIS 1104 to be able to reflect to the UE 1106 and activate the RIS 1104 for at least a short term basis. This may be information specific to the RIS to set the pattern without having to generate the pattern or it may be general information that identifies location information for the UE 1106 to allow the RIS 1104 to generate the RIS pattern itself. The pattern information can be in part derived based on the measurement report 1150 received from the UE 1106. Message 1165 is sent by the BS 1102 to the UE 1106 that includes physical layer control information such as the time/frequency resources of data message 1170, its direction (UL/DL), block size, modulation, code rate, rank, and/or HARQ information. Message 1165 may be reflected by the RIS 1104 using a RIS pattern based on the pattern information provided by the BS in message 1160 or it may be a direct link between the BS 1102 and UE 1106. Data 1170 is data that occurs between the UE 1106 and the BS 1102 in either UL or DL directions as instructed in message 1165 that is reflected off the RIS 1104.

The steps shown in FIG. 11 allow the RIS to be discovered, RIS-UE link to be detected, setup, activated and data sent over the RIS assisted connection. While the flow signaling diagram 1100 shows a complete series of steps that may be used for the RIS to be discovered, RIS-UE link to be detected, setup, and activated, data sent over the RIS assisted connection and the RIS assisted connection to be disconnected, it should be understood that individual steps, or combinations of steps, may be considered independently from the entire method.

FIG. 12 is a signal flow diagram 1200 that shows an example timing diagram for signaling between a BS 1202, a UE 1206 and a RIS 1204, where the RIS 1204 controls its own RIS pattern. The signal flow diagram 1200 incorporates many of the above discussed framework operations. The signal flow diagram 1200 shows signaling that occurs subsequent to a BS-RIS link being established, which may, for example, occur in RIS registration 1010 in FIG. 10.

The signaling 1210, 1215, 1220, 1225, 1230, 1235, 1240, 1245, 1250, identifying the RIS 1227 and measurement of the RS by the UE 1248 in FIG. 12 is substantially the same as the signaling in 1110, 1115, 1120, 1125, 1130, 1135, 1140, 1145, 1150, identifying the RIS 1127 and measurement of the RS by the UE 1148 in FIG. 11. A main difference between FIG. 12 and FIG. 11 is that in FIG. 12 the RIS 1204 is notified with the CSI accumulated by the UE 1206. The RIS 1204 uses this CSI and combines it with the knowledge of scheduled and active UE-RIS links to optimize the RIS pattern to make a successful beam to or from the UE 1206 and BS 1202.

Signaling 1260, 1265, 1270 and 1275 in combination are an operation that corresponds to activate the RIS-assisted connection 1060 and set up of communication 1070 in FIG. 10. Message 1260 is sent by the BS 1202 to the RIS 1204 that provides pattern information to the RIS 1204 to be able to reflect to the UE 1206. This information may be general information that identifies location information for the UE 1206 and CSI information to allow the RIS to generate the RIS pattern. The pattern information can be in part derived based on the measurement report 1250 received from the UE 1206. Message 1265 activates the RIS 1204 for at least a short term basis. Message 1270 is sent by the BS 1202 to the UE 1206 that includes physical layer control information. Message 1270 may be reflected by the RIS 1204 using a RIS pattern generated by the RIS 1204 based in part on the CSI information in message 1260. Data 1275 is data transmission that occurs between the UE 1206 and the BS 1202 in either UL or DL directions that is reflected off the RIS 1204.

In some embodiments, the measurement may be performed by the RIS 1204 as explained above, i.e. the RIS can detect a RS 1204 sent by the UE 1206 or BS 1202. In such a case the CSI is available at the RIS 1204 and does not need to be transmitted by the BS 1202, so there is no need for extra signaling to share CSI between RIS 1204 and BS 1202.

The example of FIG. 12 allows the utilization of more advanced RIS panels which can share some computation burden and reduce the BS-RIS command overhead.

While FIGS. 11 and 12 illustrate setting up a RIS-assisted link between a BS and a UE using a single RIS, it should be understood that the multiple BSs could each have RIS-assisted links with one or multiple UEs via one or multiple RIS. Furthermore, the concepts described in this document could be extended to the concept of setting up an RIS-assisted link between multiple UEs using a SL connection.

The steps shown in FIG. 12 allow the RIS to be discovered, RIS-UE link to be detected, setup, activated and data sent over the RIS assisted connection. While the flow signaling diagram 1200 shows a complete series of steps that may be used for the RIS to be discovered, RIS-UE link to be detected, setup, and activated, data sent over the RIS assisted connection and the RIS assisted connection to be disconnected, it should be understood that individual steps, or combinations of steps, may be considered independently from the entire method.

Based on the embodiments provided above, when a RIS receives an indication of any RISs that are in proximity to a UE, the RIS may redirect the identification. The RIS may further steers a beam between the BS and the UE according to configuration information to facilitate beam steering. The configuration information may be used for configuring a RIS pattern to redirect a waveform from the BS to the UE. In one example, the configuration information may comprise a beam direction indication. In some examples, beam steering refers to changing the beam direction, including such as changing the main lobe of a beam pattern. The beam steering may be achieved by changing the phase of the input signal on RIS elements. Phase shifting allows the signal to be targeted at a specific receiver. The beam steering may be accomplished by switching the RIS elements based on configuration information or RIS patterns, or by changing the relative phases of the RF signals driving the elements. The RIS may employ elements with a common frequency to steer a single beam in a specific direction. Different frequency beams can also be steered in different directions to serve different users. Thus, the RIS may have a diverse set of capabilities and flexibilities and facilitate the wireless communication in a network incorporating the RIS by increasing link reliability and enhancing the coverage. Also, the flexible deployment of the RIS in embodiments of the present disclosure may avoid link failure effectively and establish a fast recovery. Besides, the throughput in the network also could be increased dramatically.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method for use at a reflective intelligent surface (RIS) comprising:
   redirecting an identification of any RISs that are in proximity to a user equipment (UE), the identification sent from a network device;
   receiving first configuration information to facilitate beam steering, the first configuration information comprising:
      information that is used for configuring a third RIS pattern to redirect a waveform from the network device to the UE; and
      a short term activation of the RIS for communication with the UE; and
   steering the beam between the network device and UE.

2. The method of claim 1 further comprising:
   receiving second configuration information that is used for configuring a first RIS pattern to redirect a waveform from the network device to the UE to enable the RIS to redirect the identification of any RISs that are in proximity to the UE.

3. The method of claim 1 further comprising receiving third configuration information that is used for configuring a second RIS pattern for channel measurement to redirect a reference signal waveform from the network device to the UE.

4. The method of claim 1, wherein the information that is used for configuring a third RIS pattern to redirect a waveform from the network device to the UE is one of:
   information defining the third RIS pattern that the RIS can use to redirect the waveform; or
   channel state information (CSI) that enables the RIS to generate the third RIS pattern to redirect the waveform.

5. A method for use at a network device comprising:
   identifying any reflective intelligent surfaces (RISs) that are in proximity to a user equipment (UE);
   transmitting first configuration information to facilitate beam steering by the RIS comprising, for a RIS that is in proximity to the UE, transmitting configuration information to the RIS comprising:
      information that is used for configuring a third RIS pattern to redirect a waveform from the network device to the UE; and
      a short term activation of the RIS for communication with the UE;

transmitting second configuration information to the UE to enable the UE to receive data from the network device; and
   transmitting a beam to the UE to be steered by the RIS comprising transmitting data to the UE that is redirected by the RIS based on the third RIS pattern.

6. The method of claim 5 further comprising:
   transmitting to the UE a list of RISs that are in proximity to the UE;
   for a RIS that is in proximity to the UE, transmitting third configuration information to the RIS that is used for configuring a first RIS pattern to redirect a waveform from the network device to the UE;
   transmitting identification signaling to allow identification by the UE of the RIS that is redirecting the identification signaling after the identification signaling has been redirected to the UE by the first RIS pattern of the RIS; and
   receiving a confirmation from the UE that the list of RISs has been received by the UE.

7. The method of claim 5 further comprising:
   transmitting fourth configuration information to the UE to enable the UE to set up channel measurement;
   for a RIS that is in proximity to the UE, transmitting fifth configuration information to the RIS that is used for configuring a second RIS pattern for channel measurement to redirect a waveform from the network device to the UE;
   transmitting a reference signal to allow channel estimation by the UE for the channel that is used between the network device and the UE via the RIS that is redirecting the reference signal; and
   receiving a channel measurement report from the UE based on the reference signal transmitted by the network device and redirected by the RIS based on the second RIS pattern.

8. The method of claim 5, wherein transmitting the second configuration information to the UE to enable the UE to receive data from the network device comprises sending physical layer control signaling to the UE.

9. The method of claim 5, wherein the information that is used for configuring a third RIS pattern to redirect a waveform from the network device to the UE is one of:
   information defining the third RIS pattern that the RIS can use to redirect the waveform; or
   channel state information (CSI) that enables the RIS to generate the third RIS pattern to redirect the waveform.

10. A method for use at a user equipment (UE) comprising:
    being notified of any reflective intelligent surfaces (RISs) that are in proximity to the UE;
    receiving first configuration information to facilitate beam steering between a network device and the UE via at least one RIS that is in proximity to the UE; and
    receiving a beam that has been steered by the RIS, the beam comprising data, wherein the beam is steered by the RIS based on:
       information that is used for configuring a third RIS pattern to redirect a waveform from the network device to the UE; and
       a short term activation of the RIS for communication with the UE.

11. The method of claim 10, wherein being notified of any RISs that are in proximity to the UE comprises:
    receiving a list of RISs that are in proximity to the UE;
    receiving identification signaling to allow identification by the UE of the RIS that is redirecting the identification signaling after the identification signaling has been redirected to the UE by the first RIS pattern of the RIS; and transmitting a confirmation that the list of RISs has been received by the UE.

12. The method of claim 10 further comprising:

receiving second configuration information to enable the UE to set up channel measurement;

receiving a reference signal to allow channel estimation for a channel that is used between the network device and the UE via the RIS that is redirecting the reference signal; and transmitting a channel measurement report based on the reference signal received by the UE that is redirected by the RIS.

13. The method of claim 10, wherein receiving the first configuration information to enable the UE to receive data comprises receiving physical layer control signaling.

14. The method of claim 10, wherein the information that is used for configuring a third RIS pattern to redirect a waveform from the network device to the UE is one of:

information defining the third RIS pattern that the RIS can use to redirect the waveform; or channel state information (CSI) that enables the RIS to generate the third RIS pattern to redirect the waveform.

15. The method of claim 11, wherein the method is carried out by the UE.

16. An apparatus comprising:

a non-transitory computer readable storage medium storing programming including instructions; and a processor configured to execute the instructions to cause the apparatus to:

redirect an identification of any reflective intelligent surfaces (RISs) that are in proximity to a user equipment (UE), the identification sent from a network device;

receive first configuration information to facilitate beam steering, the first configuration information comprising:

information that is used for configuring a third RIS pattern to redirect a waveform from the network device to the UE; and a short term activation of the RIS for communication with the UE; and steer the beam between the network device and UE.

17. An apparatus comprising:

a non-transitory computer readable storage medium storing programming including instructions; and a processor configured to execute the instructions to cause the apparatus to:

be notified of any reflective intelligent surfaces (RISs) that are in proximity to a user equipment (UE);

receive first configuration information to facilitate beam steering between an apparatus and the UE via at least one RIS that is in proximity to the UE; and receive a beam that has been steered by the RIS, the beam comprising data, wherein the beam is steered by the RIS based on:

information that is used for configuring a third RIS pattern to redirect a waveform from a network device to the UE; and

a short term activation of the RIS for communication with the UE.

18. An apparatus comprising:

a non-transitory computer readable storage medium storing programming including instructions; and a processor configured to execute the instructions to cause the apparatus to:

identify any reflective intelligent surfaces (RISs) that are in proximity to a user equipment (UE);

transmit first configuration information to facilitate beam steering by the RIS, the first configuration information comprising:

information that is used for configuring a third RIS pattern to redirect a waveform from a network device to the UE; and a short term activation of the RIS for communication with the UE; and transmit second configuration information to the UE to enable the UE to receive data from the network device; and transmit a beam to the UE to be steered by the RIS comprising data that is redirected by the RIS based on the third RIS pattern.

19. A non-transitory computer readable storage medium storing programming including instructions that when executed, cause a processor to perform a method comprising:

redirecting an identification of any reflective intelligent surfaces (RISs) that are in proximity to a user equipment (UE), the identification sent from a network device;

receiving first configuration information to facilitate beam steering, the first configuration information comprising:

information that is used for configuring a third RIS pattern to redirect a waveform from the network device to the UE; and a short term activation of the RIS for communication with the UE; and steering the beam between the network device and UE.

20. A non-transitory computer readable storage medium storing programming including instructions, that when executed, cause a processor to perform a method comprising:

identifying any reflective intelligent surfaces (RISs) that are in proximity to a user equipment (UE);

transmitting first configuration information to facilitate beam steering by the RIS, the first configuration information comprising:

information that is used for configuring a third RIS pattern to redirect a waveform from a network device to the UE; and a short term activation of the RIS for communication with the UE; and transmitting second configuration information to the UE to enable the UE to receive data from the network device; and transmitting a beam to the UE to be steered by the RIS comprising data that is redirected by the RIS based on the third RIS pattern.

* * * * *